United States Patent
Blake et al.

(10) Patent No.: US 6,929,250 B2
(45) Date of Patent: Aug. 16, 2005

(54) MOBILE APPLIANCE LIFT TOOL

(76) Inventors: Richard R. Blake, 6681 Ravenswood, Sawyer, MI (US) 49125; Jeffrey T. Russell, 2568 Bell Cir., Stevensville, MI (US) 49127; Charles L. Jones, 2937 Sundance Path, Stevensville, MI (US) 49127; Paul J. Gray, 52820 Kenilworth Rd., South Bend, IN (US) 46637; Jeffrey W. Fjelstul, 4950 Wilson Rd., Coloma, MI (US) 49038; Steven P. Hinrichs, 5781 George St., Stevensville, MI (US) 49127; Richard T. Lundy, 2259 Maple La., Niles, MI (US) 49120; Henry H. Wu, 2655 Woodgate, Apt. 139, St. Joseph, MI (US) 49085

( * ) Notice: Subject to any disclaimer, the term of this patent is extended or adjusted under 35 U.S.C. 154(b) by 90 days.

(21) Appl. No.: 10/755,547

(22) Filed: Jan. 12, 2004

(65) Prior Publication Data

US 2004/0161321 A1 Aug. 19, 2004

Related U.S. Application Data

(63) Continuation-in-part of application No. 10/145,509, filed on May 14, 2002.

(51) Int. Cl.⁷ .................................................. B66F 3/22
(52) U.S. Cl. ...................... 254/122; 254/134; 254/124
(58) Field of Search ............................ 254/122, 133 R, 254/134, 126, 89 H, 124

(56) References Cited

U.S. PATENT DOCUMENTS

| | | | | | |
|---|---|---|---|---|---|
| 4,943,034 | A | * | 7/1990 | Wagnon | 254/122 |
| 5,016,858 | A | * | 5/1991 | Mitchell | 254/45 |
| 5,941,543 | A | * | 8/1999 | Kazmark, Jr. | 280/47.29 |
| 6,328,319 | B1 | * | 12/2001 | Stahler, Sr. | 280/47.18 |
| 6,364,328 | B1 | * | 4/2002 | Stahler, Sr. | 280/47.18 |
| 6,431,319 | B1 | * | 8/2002 | Myers et al. | 187/243 |
| 6,527,251 | B1 | * | 3/2003 | Garceau | 254/126 |

* cited by examiner

Primary Examiner—Lee D. Wilson
(74) Attorney, Agent, or Firm—John F. Colligan; Stephen Krefman; Robert O. Rice

(57) ABSTRACT

A mobile appliance lift tool is provided which includes a cart having a frame and a pair of legs. Each leg has a sleeve pivotally attaching the leg to an end of the frame. Each sleeve is adapted to travel up and down the leg to selectively move the frame between a substantially horizontal configuration and a substantially inclined configuration. The tool includes a strut, a support platform having a horizontal orientation, a bottom frame, and a lift mechanism engaged between the support platform and the bottom frame to move the support platform toward and away from the bottom frame, while maintaining the support platform's horizontal orientation. The strut is mounted to the bottom frame and pivotally attached to the end of the cart's frame so that the strut is disposed in a horizontal orientation when the frame is moved to either the horizontal or the inclined configuration.

41 Claims, 14 Drawing Sheets

MOBILE APPLIANCE LIFT TOOL

CROSS-REFERENCE TO RELATED APPLICATIONS

This application is a continuation-in-part of U.S. patent application Ser. No. 10/145,509, entitled "Appliance Lift Tool," filed on May 14, 2002.

BACKGROUND OF THE INVENTION

The present invention relates to a tool which may be used to transport and lift microwave ovens and other appliances and cabinets.

Oftentimes appliances, such as microwave ovens, double built-in ovens, and air conditioning units, need to be moved in or around a premises before being positioned and secured above the ground or floor to a wall or cabinet structure. For example, a microwave oven is typically positioned in a kitchen above a range or cooktop and secured in that position by removable threaded fasteners to a kitchen wall or to adjacent cabinets. To transport, install, or remove the microwave oven, typically requires at least two people. One person is typically needed to lift and support the microwave oven, while another person secures or removes the threaded fasteners supporting the microwave oven. Because of the limited space available for two people to be working on the same appliance, and because of the awkward positioning of the appliance directly above another appliance, installing and removing the microwave oven is typically costly, time consuming and has the potential for causing damage to the appliances or injury to the installers. Furthermore, heavier appliances, such as a double built-in oven or and air conditioning unit, are difficult to transport within or around the home or building premises where the unit is to be installed.

Lifting tools are known for lifting and positioning various items such as cabinets, however, typically these lifting devices are supported directly on the floor and require a clear space beneath the item being lifted and positioned in place, which cannot occur when the item is an item such as a microwave oven being installed or removed from above another appliance, such as a range or cooktop.

In addition, carts or dollies are known for transporting a heavy appliance but these dollies typically do not allow the appliance to be moved close to the space it is to be secured, requiring at least two people to lift the appliance into its final position.

SUMMARY OF THE INVENTION

Systems consistent with the present invention provide a mobile lifting tool for a microwave oven or other appliance, cabinet or similar item which is to be used for transporting the appliance from one location to another and for installing or removing the appliance from, for example, under a cabinet.

The tool may include a cart having a first pair of wheels, a pair of legs, and a frame. The pair of wheels may be rotatably mounted near a first end of the frame. Each leg may have a sleeve pivotally attaching the leg to a second end of the frame. Each sleeve is adapted to travel up and down the leg to selectively move the frame between a substantially horizontal configuration and a substantially inclined configuration. The tool also includes a support platform having a horizontal orientation, a bottom frame, a lift mechanism engaged between the support platform and the bottom frame to move the support platform toward and away from the bottom frame, while maintaining the support platform's horizontal orientation. In addition, the tool may include a strut mounted to the bottom frame of the lift tool and pivotally attached to the second end of the frame of the cart. The strut may be disposed in a horizontal orientation when the frame is moved to the horizontal configuration and to the inclined configuration to further maintain the support platform's horizontal orientation.

In one implementation, the tool also includes a base plate that has a top surface, a bottom surface, an outer edge and an inner edge pivotally attached to the first end of the frame such that the base plate may be rotated to a position that is substantially perpendicular to a horizontal axis of the cart, and the strut may selectively rest on the outer edge of the base plate when the frame is in the inclined configuration. The strut may also selectively rest on the top surface of the base plate when the second end of the frame is raised such that the frame is in a vertical position. In addition, the strut may selectively rest on the bottom surface of the base plate when the frame is in the horizontal configuration and the base plate is pivoted so that the top surface rests on the frame.

The mobile appliance lifting tool may fully support the weight of the appliance when transported in either the inclined or the horizontal configuration of the tool, and when the supporting platform is raised by the lift mechanism of the tool such that the appliance may be accurately positioned and held in place by the tool during installation or removal of the appliance from, for example, an upper cabinet.

In this manner, a single person may use the tool to transport the appliance from one location to another and to install or remove the appliance thus obviating the need for a second person to be involved in the operation.

DETAILED DESCRIPTION OF THE PREFERRED EMBODIMENT

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

Figure 1:
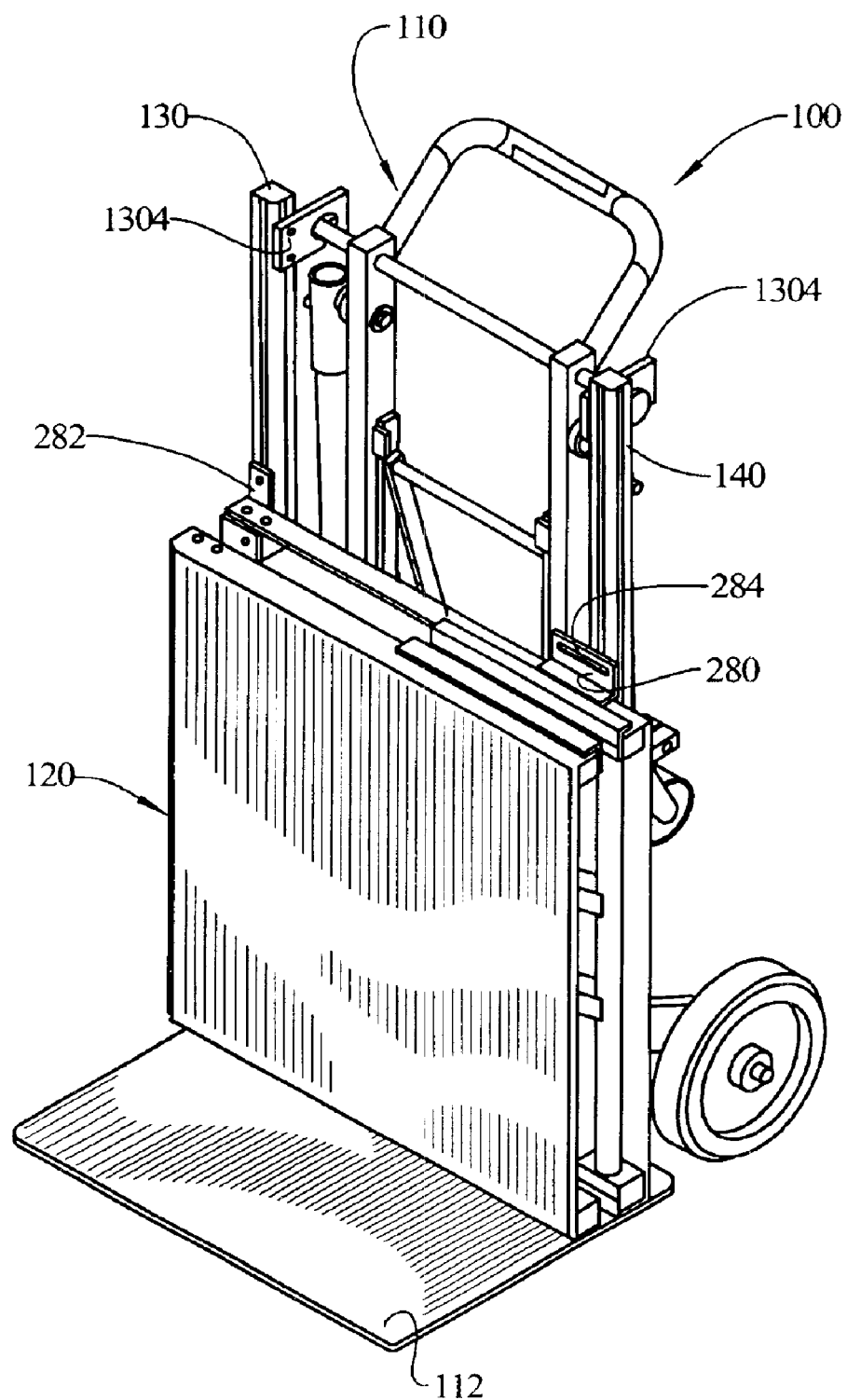
FIG. 1 depicts a perspective view of a mobile appliance lift tool embodying principles of the present invention.
Figure 2:
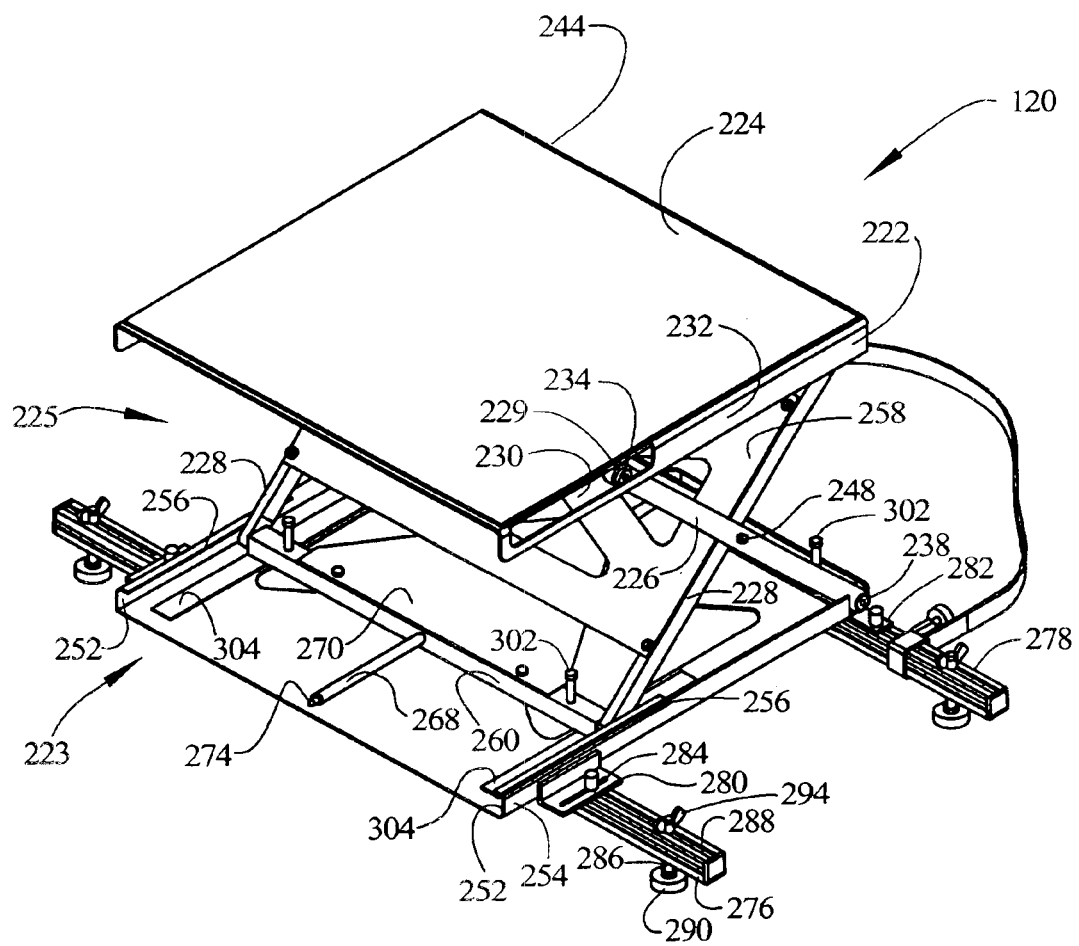
FIG. 2 is a perspective view of one embodiment of the lift tool included in the mobile appliance lift tool of FIG. 1.

FIG. 1 depicts a perspective view of a mobile appliance lift tool 100 embodying principles of the present invention. The mobile appliance lift tool 100 includes a cart 110, a lift tool 120, and one or more struts 130 and 140 that operably connect the lift tool 120 to the cart 110 as described below.

As shown in FIGS. 2–6, the lift tool 120 includes a top plate or support platform 222 having a horizontal orientation for engaging and supporting a microwave oven or some other appliance or cabinet, or similar object, a bottom frame 223 for supporting the lift tool and a lift mechanism 225 engaged between the top plate 222 and the bottom frame 223 to move the top plate 222 toward and away from the bottom frame 223 while maintaining the top plate's horizontal orientation.

Although the invention may be practiced in many different embodiments and structures, three such embodiments have been selected for this disclosure which Applicant has found to be particularly useful and effective.

If desired, an additional wear plate 224 may be secured on top of the top plate 223. The wear plate 224 may be made of a material, such as plastic, to ease in cleaning and adjusting the position of the upper appliance while it is being supported by the top plate 222.

The top plate 222 in this embodiment is held in a horizontal orientation via the lift mechanism 225 which includes a pivot arrangement with a pair of first 226 and second 228 pivot arms located at either lateral side of the top plate 222. An upper end 229 of the first pivot arm 226 engages with a slot 230 formed in a downwardly depending sidewall 232 of the top plate 222. A roller 234 is rotatingly carried on the upper end 229 of the first pivot arm 226 and is received in the slot 230. A lower end 238 of the first pivot arm 226 is pivotally attached to a bottom plate 240 which, in this embodiment, may form a part of the bottom frame 223. The second pivot arm 228 is pivotally and slidingly engaged at an upper end 242 (see FIG. 5) thereof near a rear edge 244 of the top plate 222 and is pivotally attached at a lower end 246 (see FIG. 5) to the bottom plate 240. The first pivot arm 226 and second pivot arm 228 are pivotally connected to each other by a pin 248 midway along their lengths so that the two pivot arms pivot relative to each other in a scissors fashion. The lower end 246 of the second pivot arm 228 slidingly engages the bottom plate 240 by means of a roller 250 (see FIG. 5) rotatingly held on the lower end 246 of the second pivot arm 228 which engages in a track 252 (see FIG. 1) of the bottom plate 240 formed by an upstanding sidewall 254 and a horizontal flange 256. In this manner, the top plate 222 and bottom plate 240 are held in a parallel relationship to one another by the two sets of pivot arms 226, 228 and may move toward and away from each other in this parallel relationship by the scissoring movement of the pivot arms that are pivotally secured to the rear side of the top plate and bottom plate and slidingly received near the front side of the top plate and bottom plate.

Other lifting mechanisms differing from the pivot arm arrangement disclosed may also be used according to the invention, so long as the top plate 222 is maintained in a generally horizontal orientation as it is raised and lowered.

To stabilize and strengthen the lifting tool 120 and the pivot arms 226, 228, in this embodiment, part of the bottom frame 223 may include a mid-plate 258 secured to the two second arms 228, such as by threaded fasteners, and a runner block 260 extending as a cross member between the two lower ends 246 of the second pivot arms 228. A lower pivot block 262 extends between the two lower ends 238 of the first pivot arm 226 and is secured to the bottom plate 240. A roller bar 264 extends between the two upper ends 229 of the first pivot arm 226 and a top pivot block 266 extends between the two upper ends 242 of the second pivot arm 228 and is secured to the top plate 222. In this manner, a rigid support frame is provided for the pivot arms 226, 228 which inhibits racking and which assures smooth parallel movement of the top plate 222 relative to the bottom plate 240. The various components which comprise the bottom frame 223 may be joined together as a fewer number of integral pieces than as shown in the illustrated embodiment or may be further sub-divided into additional individual components. Depending on the weight and size of the appliances to be lifted by the lift tool 220, not all of the structural elements of the bottom frame 223 may be necessary for a given application or additional structural elements may be utilized.

Figure 6:
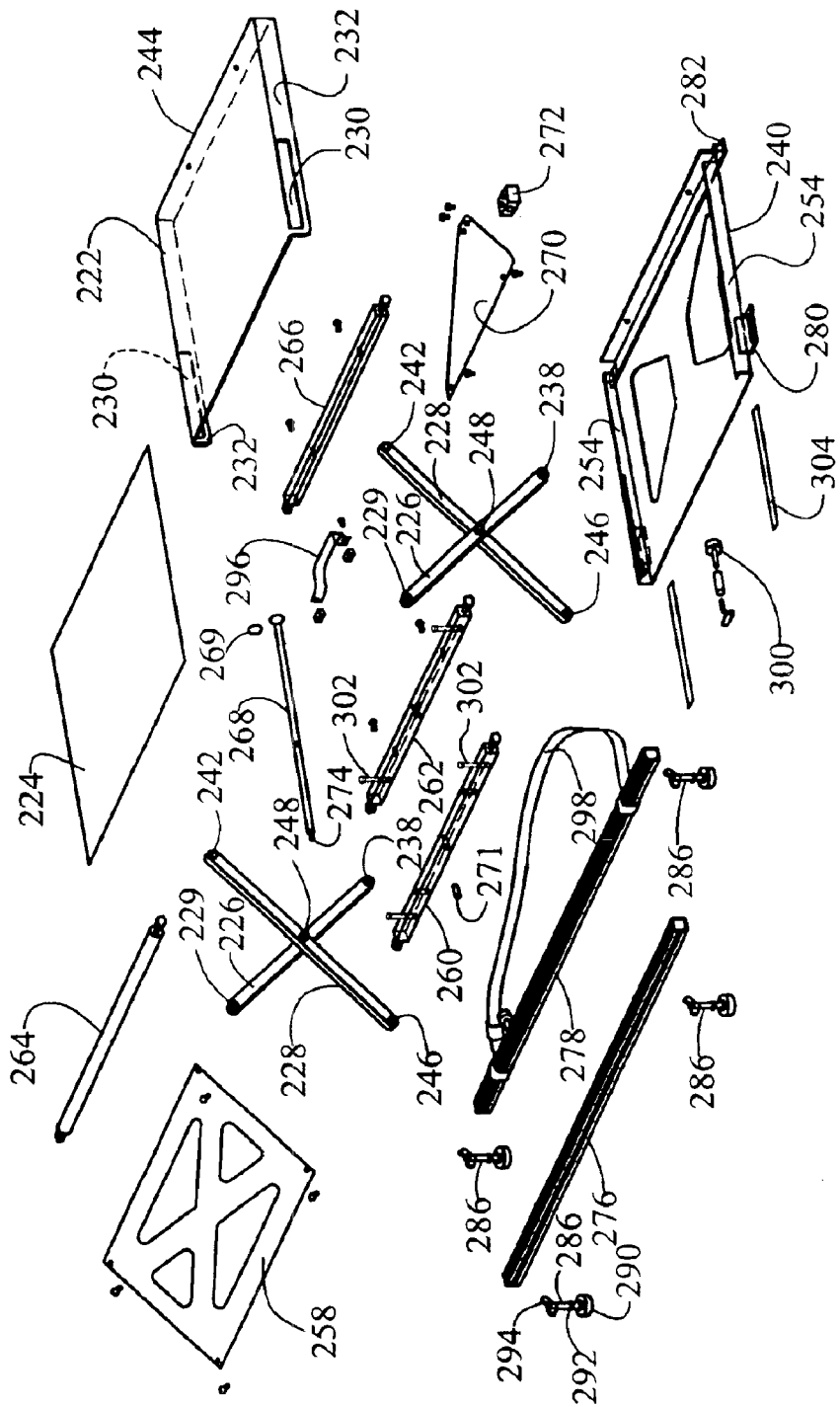
FIG. 6 depicts an exploded view of the lift tool of FIG. 2.

Extending between the runner block 260 and the lower pivot block 262, in this embodiment, as part of the lift mechanism 225, is a drive screw 268 which is rotatingly received in the lower pivot block 262 and captured there in an axial direction, such as by a retaining ring 269 (See FIG. 6). The drive screw 268 extends through the runner block 260 unimpeded, for example passing through a bearing 271 or other friction reducing device held in the runner block 260. The portion of the drive screw 268 extending through the runner block 260 has a smooth cylindrical surface. A portion of the drive screw 268 extending between the runner block 260 and the lower pivot block 262 is threaded to engage in a threaded opening located in a surrounding material which is fixed in position relative to the runner block 260. For example, a stabilizer triangle 270 is secured to the runner block 260, such as by threaded fasteners, and lays parallel to and above the drive screw 268. At a rear edge of the stabilizer triangle 270 there is secured a threaded rod retainer block 272 (see FIGS. 3 and 6) containing the threaded opening through which is threadingly received the drive screw 268. The rod retainer block 272 is secured to the stabilizer triangle 270, for example, by threaded fasteners. The threaded opening could also be formed directly in the runner block 260 or in an object connected directly to the runner block 260, alternatively to the arrangement as shown where the rod retainer block 272 is connected indirectly to the runner block 260.

The drive screw 268 is preferably provided with a drive profile 274 such as a square or hex protrusion or recess for receiving and engaging a complementarily shaped driver, such as an electrically powered drill with a square or hex head driver bit or a manually powered wrench or driver.

As the drive screw 268 is rotated, the rod retainer block 272 will be caused to move forward or backward along the threaded portion of the drive screw 268, thereby moving the runner block 260 forward or backward due to the connection through the stabilizer triangle 270. In this manner, the scissors pivoting action of the first and second pivot arms 226, 228 may be effected.

Cams, gears, ratchets or other motion converting devices, preferably employing a mechanical advantage, may be used to drive the lift mechanism 225.

In the implementation shown in FIGS. 2–6, the lift tool 120 may include a front strut 276 and a rear strut 278 to extend laterally below the front and rear of the bottom plate 240, respectively, to allow the lift tool 120 to be operated standalone without the cart 110 so that the cart 110 may be free to be used for other purposes. Alternatively, the struts 276, 278 may be used to removeably attach the lift tool 120 to the cart 110 to form the mobile appliance lift tool 100 as further discussed below.

The struts 276, 278 may be secured to the bottom plate 240 of the lift tool 120 via front 280 and rear 282 flanges extending from the bottom plate 240. The flanges 280, 282 may include slots 284 to permit forward or rearward adjustment of one or both struts 276, 278 as required for a particular installation application. As shown in FIG. 1, the flanges 280, 282 may extend from one side of the bottom plate 240 of the lift tool 120 such that the other side of the bottom plate 240 may be placed flush against a surface 112 of the cart 110 to further secure the lift tool 120 to the cart 110.

A threaded bolt 286 may also be provided in a vertical slot 288 formed in the front and rear struts 276, 278 such that the bolts 286 may move laterally along a portion of the struts. A pad 290 may be held on a lower, head end of each bolt 286. A jam nut 292 (see FIG. 4) may be carried on a threaded shank of each bolt 286 and positioned below the struts, 276, 278 while a wing nut 294 is threadingly engaged onto an end of the bolt opposite the pad 290. In this standalone implementation of the lift tool 120, the pads 290 function as feet to engage a supporting surface for the lift tool 120 and the jam nuts 292 may be used to provide a leveling adjustment so that each of the four pads may engage the support surface, even when the support surface has some unevenness or if it is not perfectly level. The wing nuts 294 may be selectively untightened and re-tightened to permit the bolts 286 to moved laterally so that a proper support surface may be engaged by the pads 290.

Figure 3:
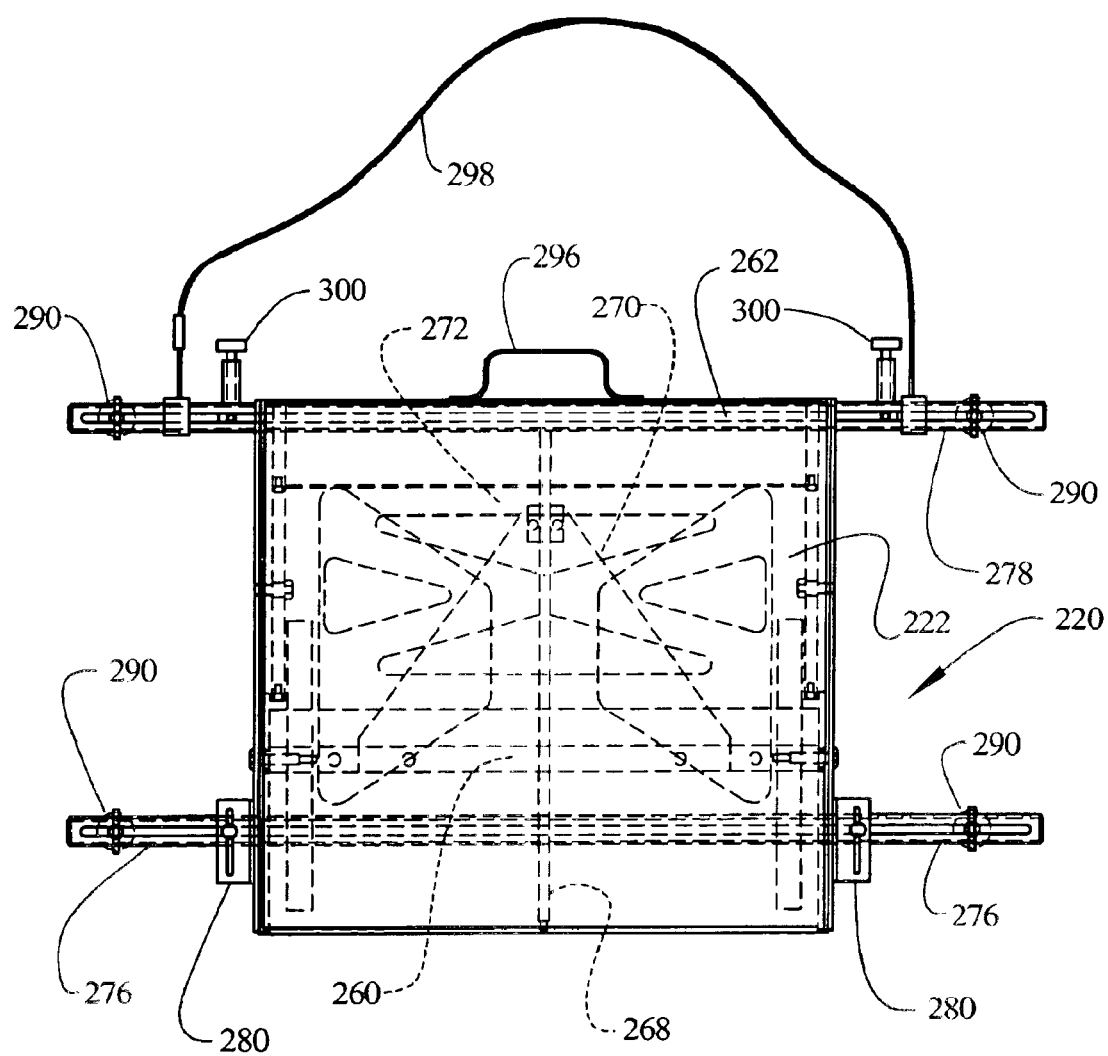
FIG. 3 depicts a plan view of the lift tool of FIG. 2.
Figure 4:
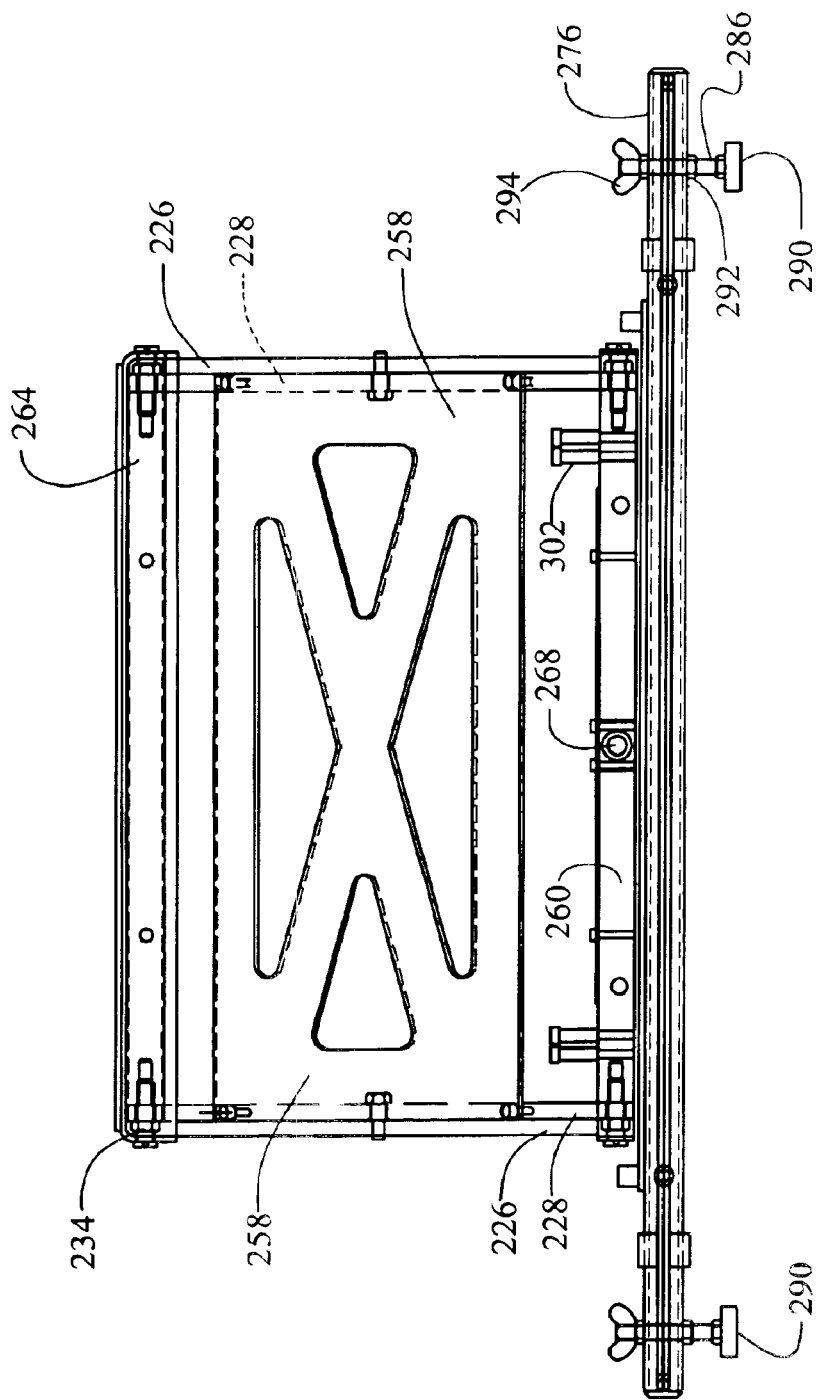
FIG. 4 depicts a front elevational view of the lift tool of FIG. 2.
Figure 5:
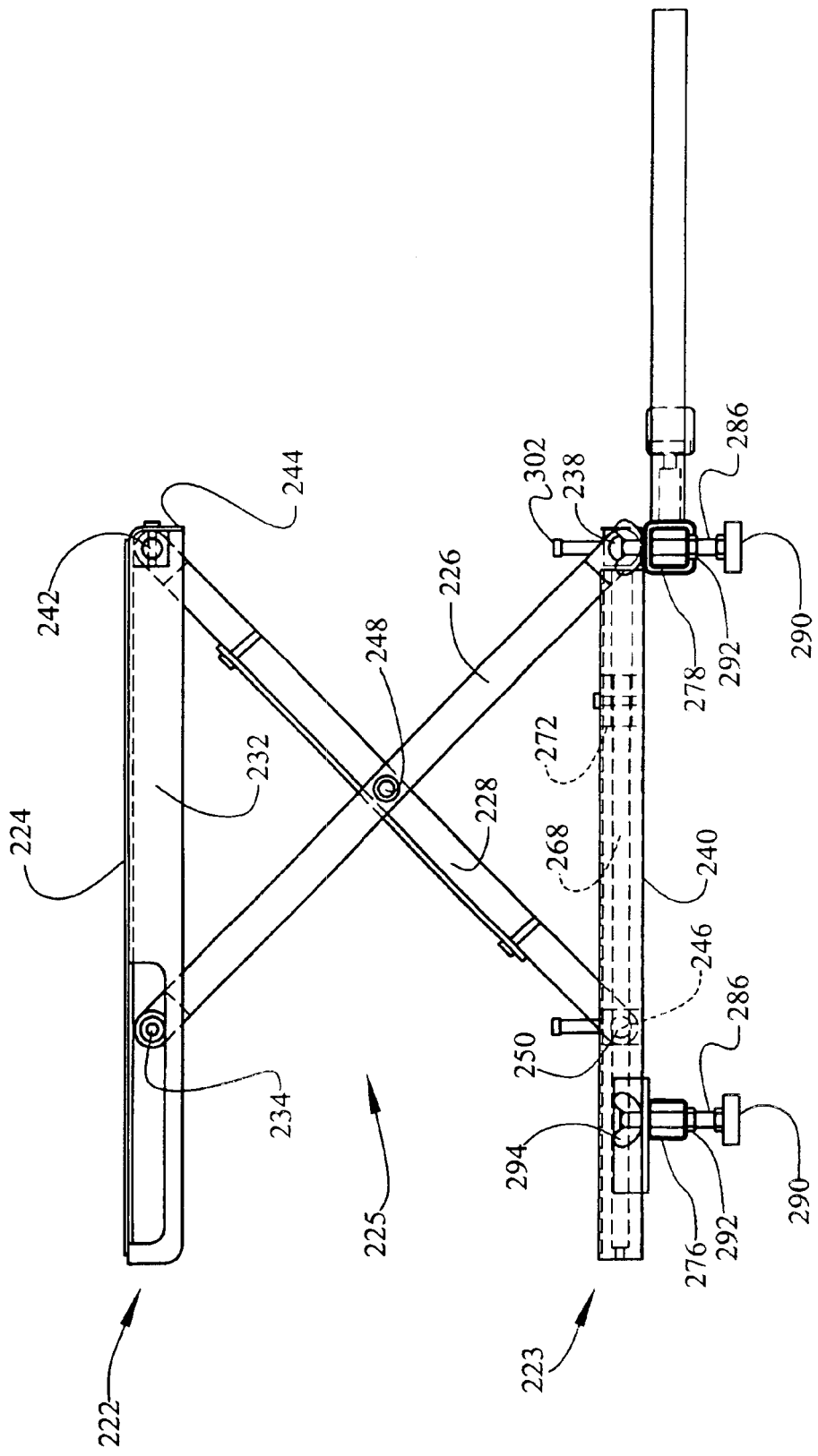
FIG. 5 depicts a side elevational view of the lift tool of FIG. 2.

As best seen in FIG. 3, the pads 290 are positioned outside of a perimeter of the top plate 222. Although the pads 290, which function as feet for the lift tool 120, are shown in this embodiment to be laterally and vertically movable, and the front pads moveable in a front-to-back direction relative to the bottom plate 240, various other embodiments in which the lift tool 110 is used without the cart 120 may include fixed pads or pads movable in fewer or more ways than shown in the exemplary embodiment disclosed. At least three feet or pads are required in this standalone implementation of the lift tool 120, and in some situations, more than four may be utilized.

A carrying handle 296 may be secured to the bottom plate 240, for example by threaded fasteners. The handle 296 may also be secured to one of the top plate 222. A strap 298 may be secured to the lift tool 20, for example, to the rear strut 278 to extend rearwardly of the rear strut. The strap 298 likewise may be secured to the top plate 222 or bottom plate 240. The carrying handle 296 or the strap 298 may be used to carry the lift tool 120 when the lift tool 120 is not operably connected to the cart 120 to form the mobile appliance lift tool 100 as described below.

Shoulder bolts 102 may be provided to extend vertically from the runner block 260 and lower pivot block 262 to engage with a lower side of the roller bar 264 and top pivot block 266 when the top plate 222 has been moved to its lowermost position, to inhibit over closing of the lift tool 220.

Friction reducing strips 304 may be provided on the lower plate 240 for engagement by the runner block 260 to assist in the smooth pivoting action of the lift mechanism 225.

Figure 7:
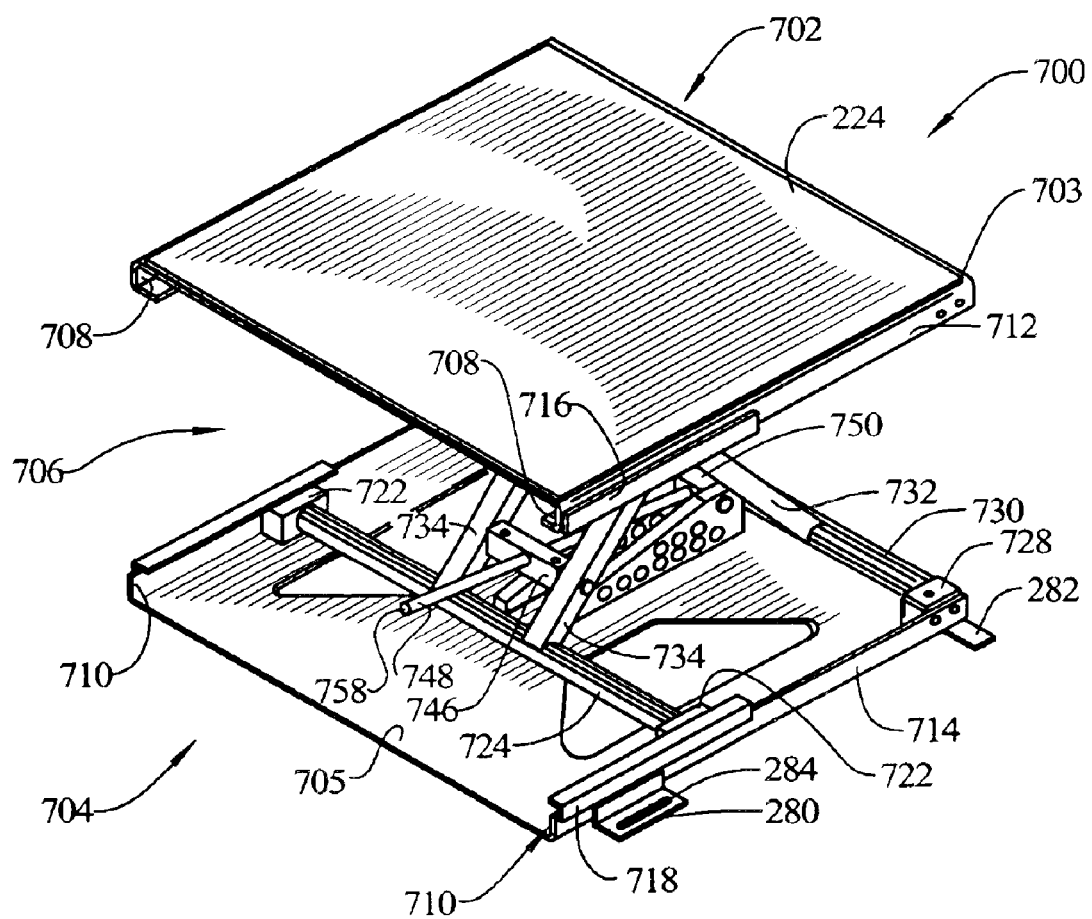
FIG. 7 is a perspective view of another embodiment of the lift tool included in the mobile appliance lift tool of FIG. 1.
Figure 8:
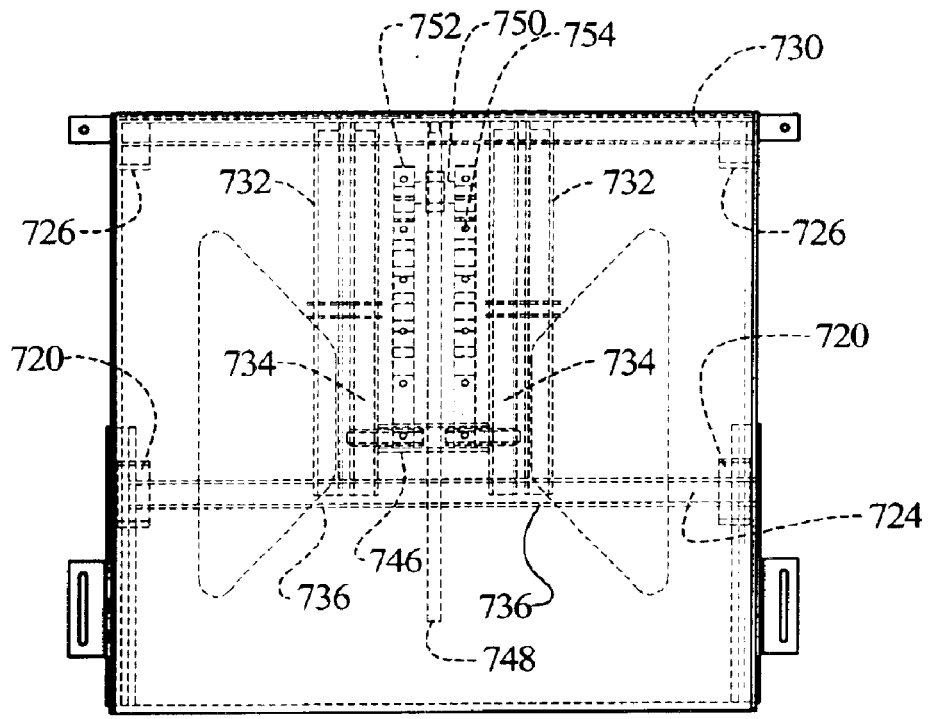
FIG. 8 depicts a plan view of the lift tool of FIG. 7.
Figure 9:
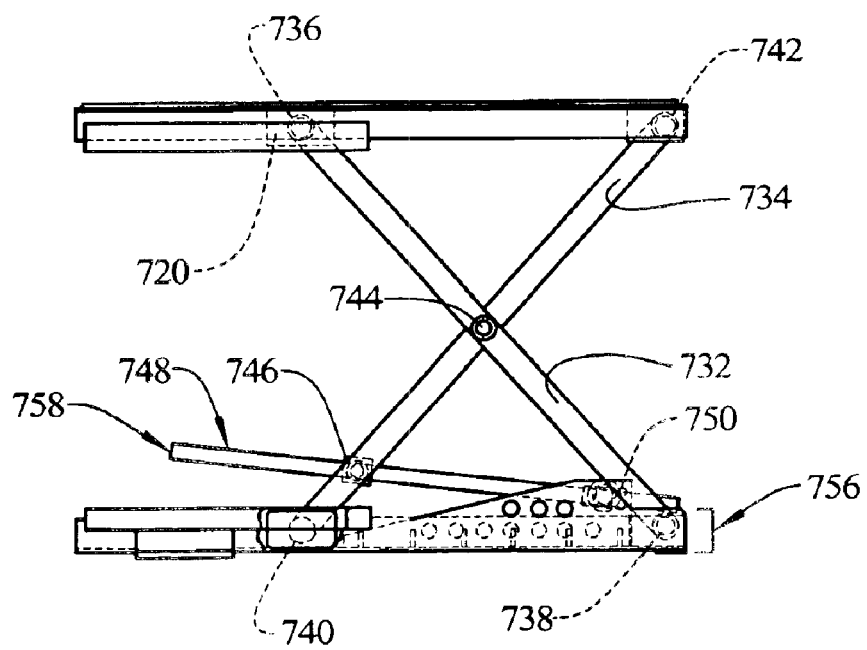
FIG. 9 depicts a side elevational view of the lift tool of FIG. 7.

FIGS. 7–9 depict another embodiment of the lift tool 700 included in the mobile appliance lift tool 100. The lift tool 700 comprises a top frame 702 having a top plate 703, a bottom frame 704 having a bottom plate 705, and a lift mechanism 706. The top plate 703 has a substantially horizontal orientation for engaging and supporting a microwave oven or some other appliance or cabinet, or similar object. The lift mechanism 706 may be engaged between the top frame 702 and the bottom frame 706 to move the top plate 703 toward and away from the bottom frame 704 while maintaining the top plate's horizontal orientation.

In this embodiment, the top 702 and bottom 704 frames each have upstanding sidewalls 712 and 714 and a horizontal flange 716 and 718 that define a pair of tracks 708 and 710 for the top and bottom frames. In addition, the top 702 and bottom 706 frames each has a pair of front rod retainer blocks 720 and 722 disposed within the tracks 708 and 710 such that each front rod retainer block 720 and 722 may be engaged to slidingly move along the respective track 708 and 710. The top 702 and bottom 704 frames both have a front rod 724 extending as a cross member between the front rod retainer blocks 720 and 722 of the respective frames. In one implementation, the front rods 724 may be pivotally attached to the front rod retainer blocks 720 and 722. In this implementation shown in FIGS. 7–9, each rod retainer block 720 and 722 has an opening to receive an end of the front rod 724 such that the front rod 724 may be engaged to rotate within the rod retainer block 720 and 722. Thus, the front rod may move the front rod retainer blocks 720 and 722 in unison within the tracks 708 and 710 when the front rod 724 is engaged to pivot or rotate.

The top 702 and bottom 704 frames also have a pair of rear rod retainer blocks 726 and 728, and a rear rod 730. Each rear rod 730 extends as a cross member between the rear rod retainer blocks 726 and 728. Each rear rod 730 is pivotally attached to respective rear rod retainer blocks 726 and 728. In this implementation shown in FIGS. 7–9, each rod retainer block 726 and 728 has an opening to receive an end of the rear rod 730 such that the rear rod 730 may be engaged to rotate within the rod retainer blocks 726 and 728. The rear retainer rods 730 are affixed to the top plate 703 and bottom plate 705, respectively.

As shown in FIGS. 7–9, the lift mechanism 706 includes a pair of first 732 and second 734 pivot arms disposed in relation to either lateral sidewall 712 of the top plate 703. An upper end 736 of the first pivot arm 732 engages the front rod 724 of the top frame 702. The first pivot arm 732 may be attached to the front rod 724 of the top frame such that the front rod 724 is adapted to pivot or rotate while causing the front rod retainer blocks 720 to move along the tracks 708 of the top frame. A lower end 738 of the first pivot arm is pivotally attached to the bottom plate 705. In the implementation shown in FIGS. 7–9, the lower end 738 is pivotally attached to the rear rod 730 of the bottom frame 704. The second pivot arm 734 has a lower end 740 that engages the front rod 724 of the bottom frame 704. The second pivot arm 734 may be attached to the front rod 724 of the bottom frame such that the front rod 724 is adapted to pivot or rotate while causing the front rod retainer blocks 722 to move, preferably in unison, along the tracks 710 of the bottom frame. An upper end 742 of the second pivot arm 734 is pivotally attached to the top plate 703. In the implementation shown in FIGS. 7–9, the upper end 742 is pivotally attached to the rear rod 730 of the top frame 702. The first pivot arm 732 and second pivot arm 734 are pivotally connected to each other by a pin 744 approximately midway along their lengths so that the two pivot arms pivot relative to each other in a scissors fashion. In this manner, the top plate 703 and bottom plate 705 are held in a parallel relationship to one another by the two sets of pivot arms 732, 734 and may move toward and away from each other in this parallel relationship by the scissoring movement of the pivot arms that are pivotally secured to the rear side of the top plate and bottom plate and slidingly received near the front side of the top plate and bottom plate.

In one implementation, the lift mechanism 706 may have two pairs of pivot arms 732, 734, where each pair is preferably disposed in mirror relationship to the other pair and in proximity to a midpoint of the top plate 703. In this implementation, the lift mechanism 706 has a rod retainer block 746 extending as a cross member between the two second pivot arms 734. The rod retainer block 746 is preferably disposed in proximity to the lower ends 740 of the second pivot arms 734. The pivot arms 732, 734, the front rods 724, rear rods 730, and the rod retainer block 746 provide a rigid support frame, which inhibits racking and which assures smooth parallel movement of the top plate 703 relative to the bottom plate 705. The various components which comprise the top frame 702 and the bottom frame 704 may be joined together as a fewer number of integral pieces than as shown in the illustrated embodiment or may be further sub-divided into additional individual components.

The lift mechanism 706 may also have a drive screw 748 and a pivot block 750 that has a threaded opening to receive and engage the drive screw 748. The drive screw 748 is rotatingly received in the pivot block 750 and may be captured there in an axial direction, such as by a retaining ring 269 (as shown in FIG. 6 for lift tool 120). The pivot block 750 may be pivotally attached to the bottom frame 705 near the rear of the bottom frame 704. The drive screw 748 extends between the rod retainer block 746 and the pivot block 750. The threaded opening of the rod retainer block 746 may be located in a surrounding material that is fixed in position relative to the front rod 724 and to the pivot block 750. In one implementation, the bottom frame has two parallel walls or brackets 752 and 754 that are affixed (e.g., via fasteners) to the bottom plate 705 and disposed such that the drive screw 248 lies axially between the brackets 752 and 754. In this implementation, the pivot block 750 may be pivotally attached between the brackets 752 and 754 such that the pivot block 750 is raised a height 756 above the bottom plate 705 to allow the drive screw 248 to clear the rear rod 730 of the bottom frame 704.

The drive screw 748 is preferably provided with a drive profile 758 such as a square or hex protrusion or recess for receiving and engaging a complementarily shaped driver, such as an electrically powered drill with a square or hex head driver bit or a manually powered wrench or driver.

As the drive screw 748 is rotated, the rod retainer block 746 will be caused to move forward or backward along the threaded portion of the drive screw 748, thereby moving the rod retainer block 746 forward or backward. In this manner, the scissors pivoting action of the first and second pivot arms 732, 734 may be effected.

Figure 15:
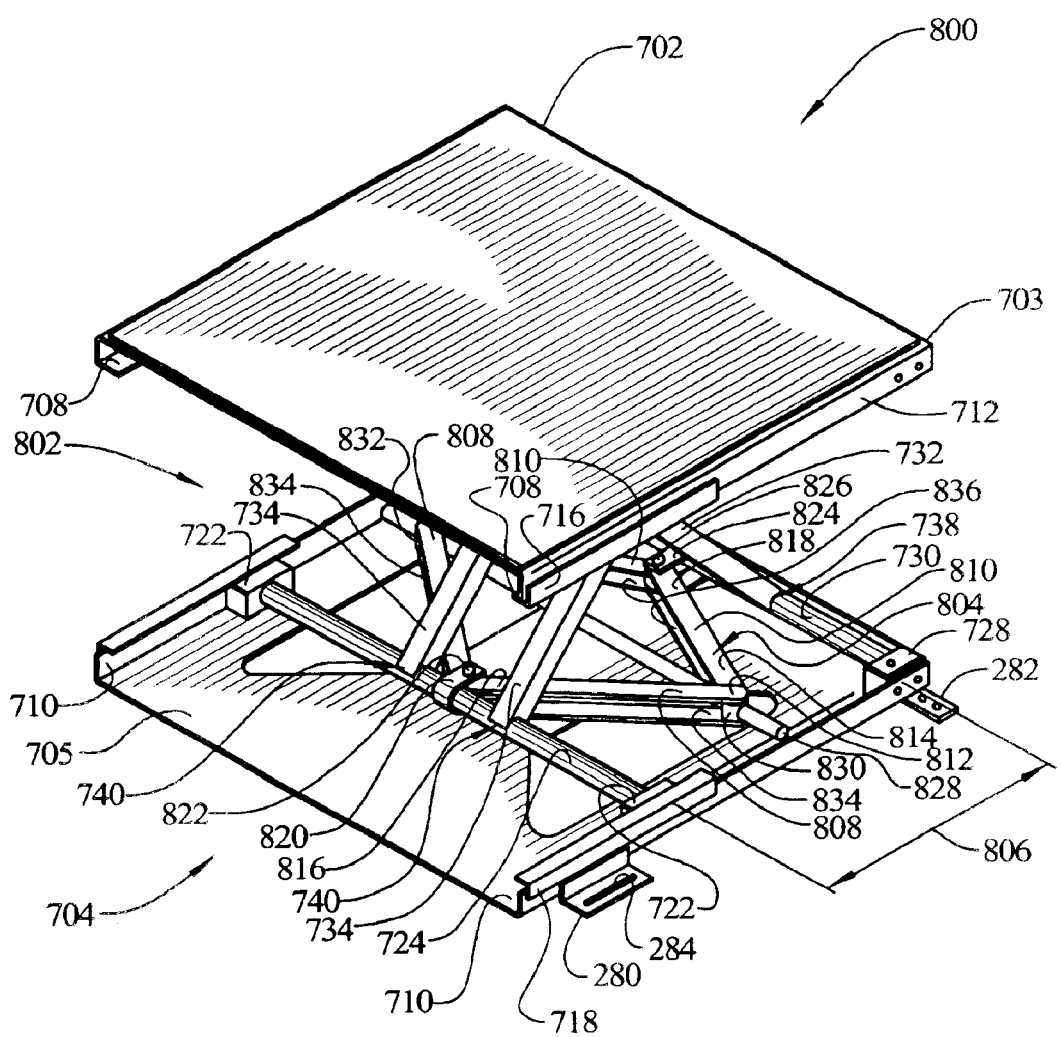
FIG. 15 is a perspective view of another embodiment of the lift tool included in the mobile appliance lift tool of FIG. 1.

FIG. 15 depicts a perspective view of another embodiment of the lift tool 800 included in the mobile appliance lift tool 100. Like the lift tool 700, the lift tool 800 comprises a top frame 702 having a top plate 703, a bottom frame 704 having a bottom plate 705. The lift tool 800, however, has a lift mechanism 802 that is different than the lift mechanism 706 of the lift tool 700 as explained in detail below. The lift mechanism 802 may be engaged between the top frame 702 and the bottom frame 706 to move the top plate 703 toward and away from the bottom frame 704 while maintaining the top plate's horizontal orientation.

The top frame 702 and the bottom frame 704 of the lift tool 800 each has a pair of tracks 708 and 710, a pair of front rod retainer blocks 720 and 722 (not in view in FIG. 15) disposed within the tracks 708 and 710, and a front rod 724 extending as a cross member between the front rod retainer blocks 720 and 722 of the respective frames. In the implementation shown in FIG. 15, the front rods 724 of the top and bottom frames 702 and 704 are pivotally attached to the front rod retainer blocks 720 and 722 so that the front rods 724 may move the front rod retainer blocks 720 and 722 in unison within the tracks 708 and 710 when the front rods 724 are engaged to pivot or rotate.

The top 702 and bottom 704 frames also have a pair of rear rod retainer blocks 726 (not in view in FIG. 15) and 728, and a rear rod 730 that extends as a cross member between the respective rear rod retainer blocks 726 and 728. Each rear rod 730 is pivotally attached to the respective rear rod retainer blocks 726 and 728. The rear retainer rods 726 and 728 are affixed to the top plate 703 and bottom plate 705, respectively.

As shown in FIG. 15, the lift mechanism 802 includes a pair of first 732 and second 734 pivot arms disposed in relation to either lateral sidewall 712 of the top plate 703. An upper end 736 of the first pivot arm 732 engages the front rod 724 of the top frame 702 as shown in FIG. 8 for lift tool 700. The first pivot arm 732 may be attached to the front rod 724 of the top frame such that the front rod 724 is adapted to pivot or rotate while causing the front rod retainer blocks 720 to move along the tracks 708 of the top frame. A lower end 738 of the first pivot arm 732 is pivotally attached to the bottom plate 705. In the implementation shown in FIG. 15, the lower end 738 is pivotally attached to the rear rod 730 of the bottom frame 704. The second pivot arm 734 has a lower end 740 that engages the front rod 724 of the bottom frame 704. The second pivot arm 734 may be attached to the front rod 724 of the bottom frame 704 such that the front rod 724 is adapted to pivot or rotate while causing the front rod retainer blocks 722 to move, preferably in unison, along the tracks 710 of the bottom frame. An upper end 742 (not in view in FIG. 15) of the second pivot arm 734 is pivotally attached to the top plate 703, and is preferably attached to the rear rod 730 of the top frame 702 as shown in FIG. 9 for lift tool 700. The first pivot arm 732 and second pivot arm 734 are pivotally connected to each other by a pin 744 (as shown in FIG. 9 for lift tool 700) approximately midway along their lengths so that the two pivot arms pivot relative to each other in a scissors fashion. In this manner, the top plate 703 and bottom plate 705 are held in a parallel relationship to one another by the two sets of pivot arms 732, 734 and may move toward and away from each other in this parallel relationship by the scissoring movement of the pivot arms that are pivotally secured to the rear side of the top plate and bottom plate and slidingly received near the front side of the top plate and bottom plate. In one implementation as shown in FIG. 15, the lift mechanism 802 has two pairs of pivot arms 732, 734, where each pair is preferably disposed in mirror relationship to the other pair and in proximity to a midpoint of the top plate 703. The pivot arms 732, 734, and the front rods 724 provide a rigid support frame, which inhibits racking and which assures smooth parallel movement of the top plate 703 relative to the bottom plate 705.

The lift mechanism 802 of the lift tool 800 also includes a jack 804 operably coupled to the front rod 724 of either the top or bottom frames 702 and 704 and operably configured to selectively adjust a distance 806 between the front and rear rods 724 and 730. The jack 804 may be operably coupled between the front and rear rods 724 and 730 of the bottom frame 704. In the implementation shown in FIG. 15, the jack has two pairs of first 808 and second 810 lever arms each having an inner end 812, 814 and an outer end 816, 818. The pair of lever arms 808 and 810 are disposed in relation to the bottom plate 705 and pivotally attached together near the inner end 812 and 816 of each lever arm. The outer end 816 of the first lever arm 808 engages the front rod 724 of the bottom frame 704 while the outer end 818 of the second lever arm 810 engages the bottom frame 704. The outer end 814 of the first lever arm 808 may be attached to the front rod 724 of the bottom frame so that the front rod 724 is adapted to pivot or rotate while causing the front rod retainer blocks 722 to move along the tracks 710 of the top frame and while causing, via the first and second pivot arms 732 and 734, the front rod retainer blocks 720 to move along the tracks 708. The outer end 818 may be pivotally attached to the rear rod 730 of the bottom frame 704 so that the front rod 724 is adapted to pivot or rotate when engaged by the first pivot arm 732 as described above. The lift mechanism 802 also may include a first jack clamp 820 adapted to receive a portion of the front rod 724 and a pin 822 adapted to extend through the clamp 820 and through the outer end 816 of the first lever arm 808 so that the front rod 724 is retained within the clamp 820. The lift mechanism 802 may also include a second jack clamp 824 adapted to receive a portion of the rear rod 730 and a pin 826 adapted to extend through the clamp 824 and through the outer end 818 of the second lever arm 810 so that the rear rod 730 is retained within the clamp 824.

In the implementation shown in FIG. 15, the jack 802 of the lift mechanism 802 has two pairs of lever arms 808 and 810, where each pair is preferably disposed in mirror relationship to the other pair and in proximity to a midpoint of the bottom plate 705. In this implementation, the jack 802 has a drive screw 828, a rod retainer block 830 that has a threaded opening to receive and engage the drive screw 828, and a pivot block 832 that is adapted to rotatingly receive and capture the drive screw 828 in an axial direction, such as by a retaining ring 269 (not in view in FIG. 15).

The rod retainer block 830 is pivotally attached to the inner ends 812 and 814 of a first of the two pairs of lever arms 808 and 810. The pivot block 832 is pivotally attached to the inner ends 812 and 814 of a second of the two pairs of lever arms 808 and 810.

As the drive screw 828 is rotated, the rod retainer block 830 will be caused to move forward or backward along the threaded portion of the drive screw 828, thereby moving the pivot block 832 forward or backward causing the two pair of lever arms 808 and 810 to pivot and selectively adjust the distance 806 between the front and rear rods 724 and 730. When the distance 806 is selectively adjusted by the jack 804, scissors pivoting action of the first and second pivot arms 732, 734 is effected.

To connect the lift tool 700, 800 to the cart 110 to form the mobile appliance lift tool 100, the bottom plate 705 of the lift tool 700, 800 may include a front flange 280 and a rear flange 282 to secure struts 276, 278 to the bottom plate 705 of the lift tool 700, 800 as discussed above and explained in further detail below.

Figure 10:
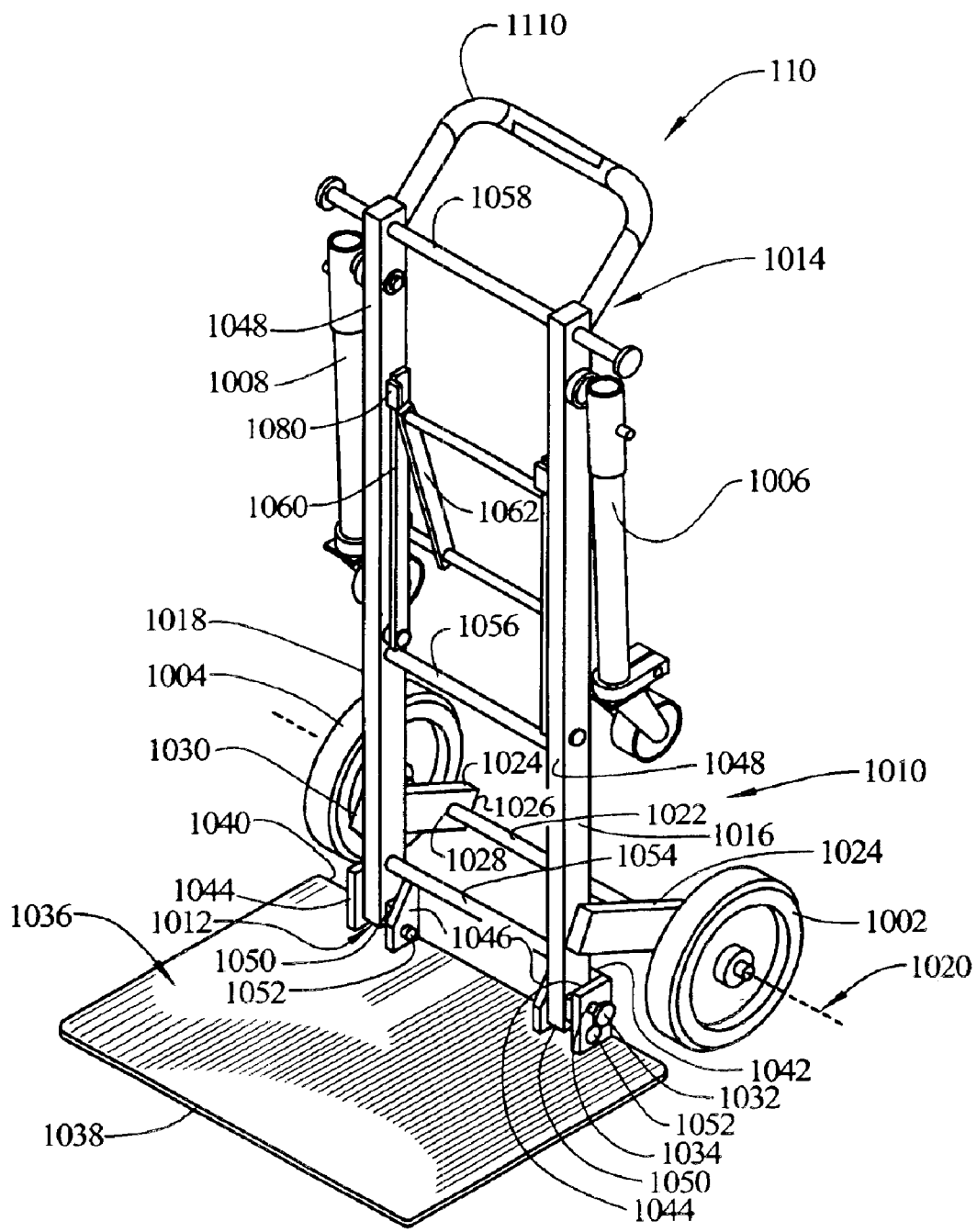
FIG. 10 depicts a perspective view of the cart of the mobile appliance lift tool of FIG. 1 deployed in a vertical configuration.
Figure 11:
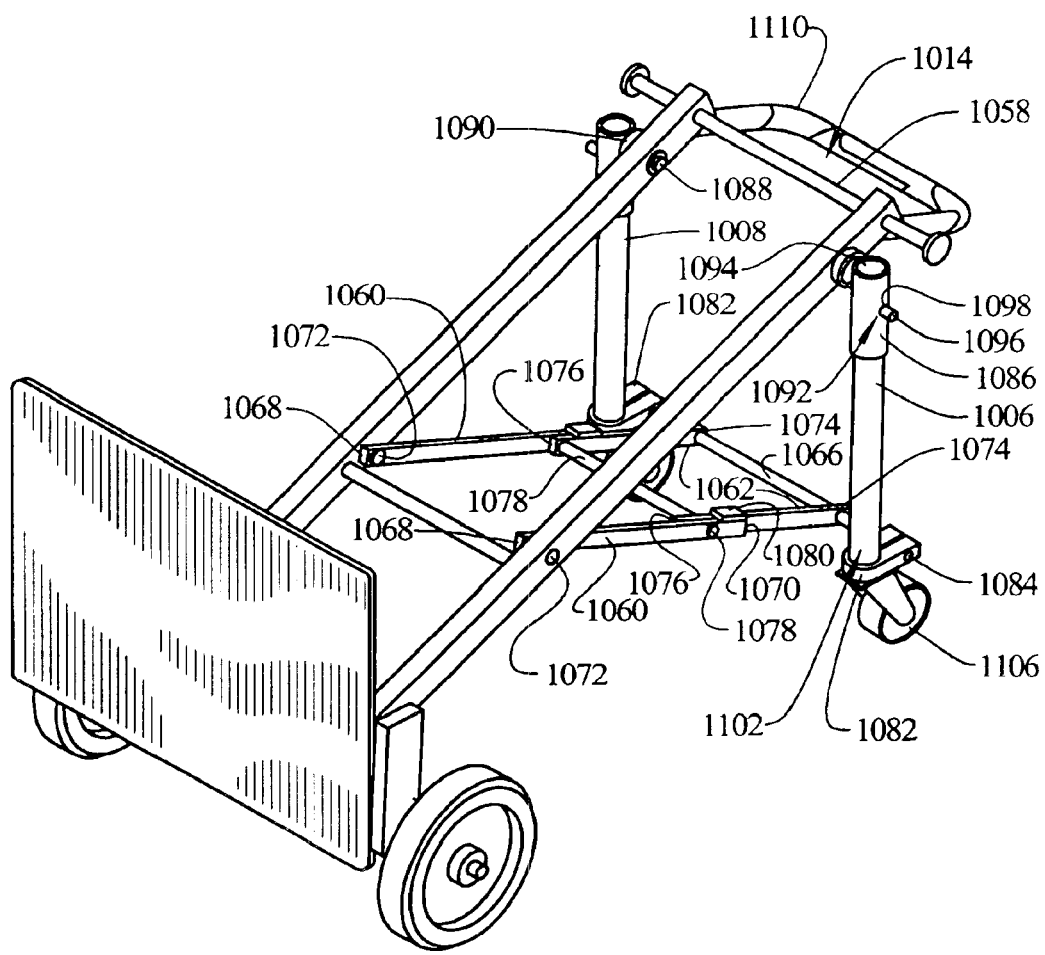
FIG. 11 depicts a perspective view of the cart of the mobile appliance lift tool of FIG. 1 deployed in an inclined configuration.
Figure 12:
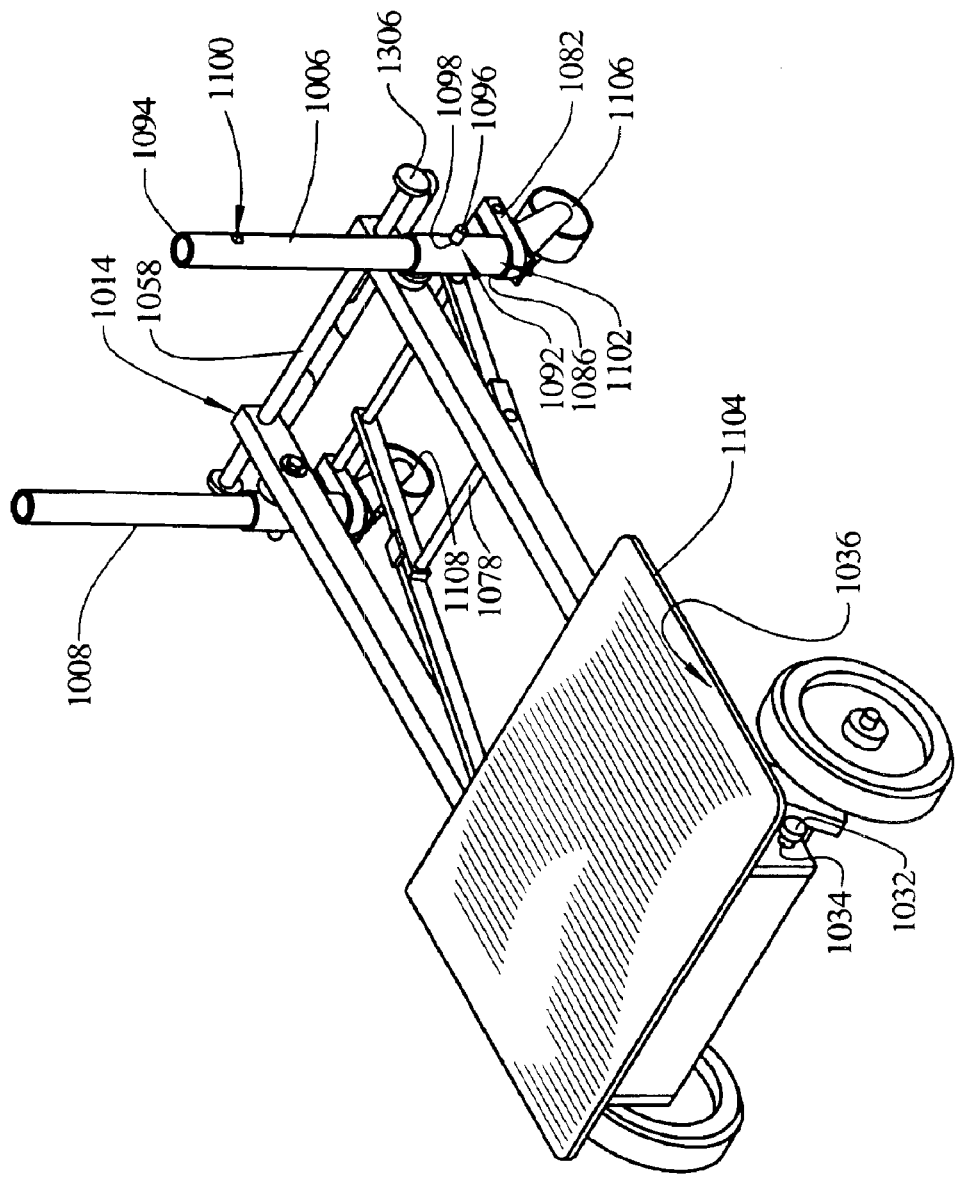
FIG. 12 depicts a perspective view of the cart of the mobile appliance lift tool of FIG. 1 deployed in a horizontal configuration.

FIGS. 10–12 depict one embodiment of the cart 110 of the mobile appliance lift tool 100. As discussed below, the cart 120 may be deployed in multiple configurations to facilitate the transport and use of the lift tool 120, 700, 800. For example, the cart 110 may be deployed in a substantially vertical configuration as shown in FIG. 10, an inclined configuration as shown in FIG. 11, and in a substantially horizontal configuration as shown in FIG. 12.

In the implementation shown in FIG. 10, the cart 110 includes a first pair of wheels 1002 and 1004, a pair of legs 1006 and 1008, and a frame 1010. The frame has a lower end 1012 and an upper end 1014. As discussed below, the legs 1006 and 1008 are pivotally attached to the upper end 1014 of the frame 1010 to allow the cart 110 to be deployed in either the vertical, inclined, or horizontal configuration.

Each wheel 1002, 1004 of the cart 110 is rotatably mounted to a respective lateral side 1016, 1018 of the frame 1010 near the lower end 1012 of the frame such that the frame 1010 may be rotated about an axis 1020 parallel to the lower end 1012. The wheels 1002 and 1004 may be mounted on an axle 1022, which may be pivotally attached to the frame 1010 near the lower end 1012 via a pivot block 1024. As shown in FIG. 10, the pivot block 1024 has one end 1026 that includes an opening 1028 though which the axle 1022 is rotatingly retained. The pivot block 1024 has another end 1030 that is pivotally attached to the lower end 1012 of the frame 1010. The frame may include a stop 1032 that extends away from the lower end 1012 of the frame 1010 such that the stop 1032 may engage the pivot block 1024 to inhibit the pivot block 1024 from rotating beyond the stop 1032 as clearly shown in FIG. 12. The stop 1032 may be a bar, cylindrical rod, or other supporting member capable of withholding a force upon the axle 1022 or the pivot block 1024, such as from the force from a person's foot.

It is contemplated that a single wheel 1002 may be used. In particular, a single wheel 1002 may be used when the wheel 1002 is pivotally attached along a central axis of the frame and when the wheel 1002 has a width sufficient to balance the cart 110 in the horizontal configuration or the inclined configuration.

The cart 110 may also include a base plate 1036 that has a front end 1038 (or outer edge) and a rear end 1040. The rear end 1040 of the base plate 1036 may be pivotally attached to the lower end 1012 of the frame 1010 such that the base plate 1036 may be rotated between a down or first position that is substantially perpendicular to the frame 1010 as shown in FIG. 10 and an up or second position that is substantially parallel to the frame 1010 as shown in FIG. 12. In one implementation, the cart 110 may have a brace 1042, which may be a rigid wall, that is attached to the rear end 1040 of the base plate 1036. The brace 1042 is adapted to abut or engage the lower end 1012 of the frame 1010 so as to inhibit further rotation of the base plate 1036 when the base plate 1036 is rotated to the down position, which is substantially perpendicular to the frame 1010. The brace 1042 may also have L-shaped ends 1044. In one implementation, the lower end 1012 of the frame 1010 is pivotally attached between the L-shaped ends 1044 of the brace 1042. In another implementation, the brace 1042 may also have internal walls 1046. In this implementation, the frame 1010 includes two supporting members 1048 that correspond to respective sides 1016 and 1018 of the frame 1010. Each supporting member 1048 has an end 1050 that define the lower end 1012 of the frame 1010. The end 1050 of each supporting member 1048 may be disposed between a respective L-shaped end 1044 and internal wall 1046 of the brace 1042. In this implementation, each L-shaped end 1044, each internal wall 1046, and each end 1050 of the supporting members 1048 has a respective opening that is adapted to receive and retain a pin 1052 or rod shaped fastener such that the brace 1036 may pivot or rotate between the down position and the up position.

The frame 1010 may include one or more cross-members 1054, 1056, and 1058, which extend between sides 1016 and 1018 of the frame 1010 (e.g., between support members 1048) to provide a rigid structure to the frame 1010. As discussed in detail below, one of the cross-members (e.g., the upper cross-member 1058) may extend beyond the sides 1016 and 1018 of the frame 1010 so the struts 276, 278 may engage the upper cross-member 1058, allowing the lift tool 120, 700, 800 to be secured to the cart 110.

To allow the cart 110 to be deployed between the vertical configuration and either the inclined or the horizontal configuration, the cart 110 may include an upper link 1060 pivotally attached to one of the supporting members 1048, a lower link 1062 pivotally attached to the upper link 1060, and a secondary cross-member 1064 extending between and operably connected to the legs 1006 and 1008 of the cart 110. The upper link 1060 has a first end 1068 and a second end 1070. The first end 1068 of the upper link 1060 may be pivotally attached by a pin 1072 to the supporting member 1048 between the lower end 1012 and a midpoint of the frame 1010. The lower link 1062 may also have a first end 1074 and a second end 1076. The first end 1074 of the lower link 1062 is pivotally attached to the cross-member 1064. The second end 1070 of the upper link 1060 and the second end 1076 of the lower link 1062 are pivotally connected to each other by a pin or rod 1078 so that the two links 1060, 1062 pivot relative to each other. The upper link 1060 may have a flange or cap 1080 that abuts the lower link 1062 when the legs 1006, 1008 are rotated away from the frame 1010 and the upper and lower links 1062 and 1064 are axially aligned. The cap 1080 is adapted to inhibit the two links 1060, 1062 from pivoting beyond the axial alignment of the links 1060, 1064 so that the cart 110 may remain in either the incline or horizontal configuration while the lift tool 110, 700 is used to lift an appliance as further discussed below. In one implementation, the cart 110 may include a pair of upper and lower links 1060 and 1062. In this implementation, the rod 1078 pivotally connects the second ends 1070, 1076 of the pair of links 1060 and 1062 such that when the rod 1078 is moved upward, the legs 1006 and 1008 (e.g., as the cross-member 1066 is engaged by the lower links 1062) are rotated towards the frame 1010, and when the rod 1078 is moved downward, the legs 1006 and 1008 are rotated away from the frame 1010. As shown in FIG. 11, each leg 1006 and 1008 may include a clamp 1082 that has an opening 1084 to receive and retain the cross-member 1066.

To allow the cart 110 to be deployed between the inclined and the horizontal configuration, each leg 1006, 1008 may have a sleeve 1086 that is adapted to slidingly travel up and down the leg and that pivotally connects the leg 1006, 1008 to the frame 1010 via a fastener 1088, such as a bolt that extends through an opening in the leg 1006, 1008 and is affixed (e.g., welded or riveted) at one end to the sleeve 1086. The fastener may also extend through a spacer 1090, such as a washer, located between the sleeve 1086 and the leg 1006, 1008. The sleeve 1086 has a locking mechanism 1092 that is adapted to releaseably hold the sleeve 1086 near an upper end 1094 of the leg 1006, 1008 so that the cart 110 may be deployed in the inclined configuration shown in FIG. 11. In one implementation, the locking mechanism 1092 includes a locking pin 1096 and an opening 1098 that extends through the sleeve 1086 and that is adapted to receive and retain the locking pin 1096. As shown in FIG. 12, each leg 1006, 1008 has a corresponding opening 1100 that may be aligned with the opening 1098 in the sleeve 1086 to allow the locking pin 1096 to engage the respective leg 1006, 1008, such that the sleeve 1086 is held near the upper end 1094 of the leg 1006, 1008.

In the implementation shown in FIG. 12, the locking mechanism 1092 may be released by pulling the locking pin 1096 free from the opening 1100 near the upper end 1094 of the leg 1006, 1008. When the locking mechanism 1092 is released, the sleeve 1086 is adapted to travel down towards a lower end 1102 of the leg 1006, 1008. In one implementation, the sleeve 1086 may travel down the leg 1006, 1008 and rest on the clamp 1086 (or other protrusion located near the lower end 1102 of the leg 1006, 1008) so that the upper end 1014 of the cart 110 is lowered to be substantially level with the lower end 1012 of the cart, allowing the cart 110 to be deployed in the horizontal configuration shown in FIG. 12. When the cart 110 is in the horizontal configuration, the base plate 1036 may be pivoted such that a surface 1104 of the base plate 1036 rests on the frame 1010.

The cart 110 may also have a pair of secondary wheels 1106, 1108. Each secondary wheel 1106, 1108 is mounted to the lower end 1102 of a respective leg 1006, 1008. In one implementation, each wheel 1106, 1108 may be a castor that is adapted to pivot (e.g., up to 360°) in relation to the leg 1006, 1008. Thus, the cart 110 may travel on the wheels 1002, 1004 and the secondary wheels 1106, 1108 while in either the inclined configuration or the horizontal configuration.

In addition, the cart 110 may also have a handle 1110 that is attached to the upper end 1014 of the frame 1010. A person using the mobile appliance lift tool 100 as shown in FIG. 1 may use the handle to pivot the frame 1010 about the axis 1020 and to move the lift tool 120 to a location, such as a garage of a home, where an appliance to be moved is presently located.

Figure 13:
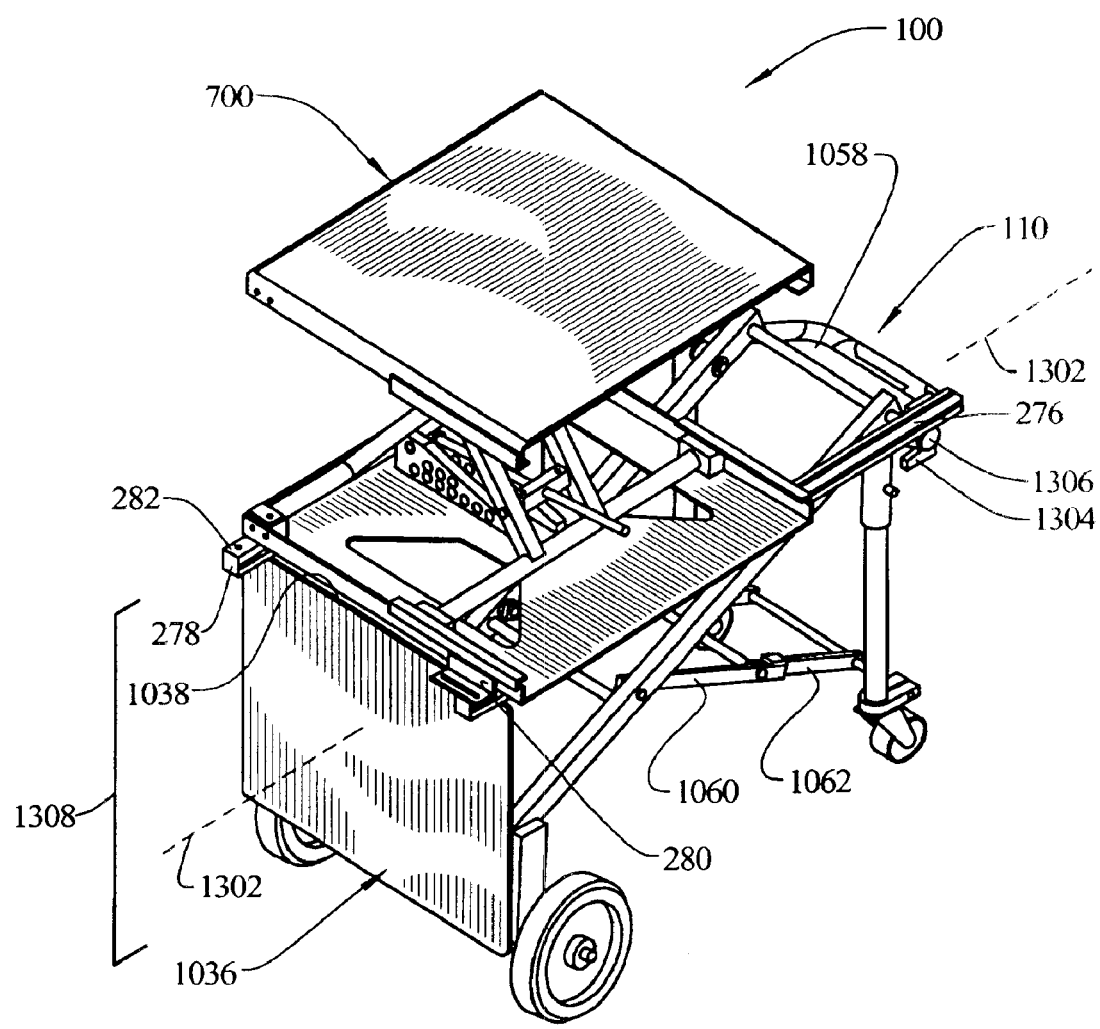
FIG. 13 depicts a perspective view of the mobile appliance lift tool of FIG. 1 deployed in an inclined configuration.

Turning to FIG. 13, the mobile appliance lift tool 100 is shown deployed in an inclined configuration. In one implementation, the mobile appliance lift tool 100 may be deployed in the inclined configuration by moving the rod 1078 downward so that links 1060 and 1062 pivot downward together causing the legs 1006 and 1008 to rotate away from the frame 1010. The locking mechanism 1092 of each sleeve 1086 is engaged (e.g., locking pin 1096 is received by the opening 1096 of the leg 1006, 1008) to hold the sleeve 1086 near the upper end 1094 of the leg 1006, 1008 so that the cart 110 is deployed in the inclined configuration. The base plate 1036 is pivoted so that the base plate 1036 is perpendicular to a horizontal axis 1302 of the cart 110 in the inclined configuration. The base plate 1036 may be held perpendicular to the horizontal axis 1302 when the pivot bar 1024 engages the stop 1032. Struts 276, 278 are disposed on either side 1016, 1018 of the frame 1010 so that each strut 276, 278 extends from the upper cross-member 1058 to the base plate 1036. In this implementation, each strut 276, 278 may be supported by the front end 1038 of the base plate and the upper-cross member 1058. In addition, each strut 276, 278 may have a clasp 1304 that is pivotally attached to the strut 276, 278 in proximity to the upper cross-member 1058. Each clasp 1304 is adapted to selectively engage the upper cross-member 1058 so that the strut 276, 278 is selectively retained on the cart 110. Each end of the upper cross-member 1058 may have a cap 1306 adapted to inhibit the strut 276, 278 from moving laterally away from the frame 1010 of the cart 110.

As shown in FIG. 12, the lift tool 120, 700, 800 may be positioned on and secured to the struts 276, 278 via front 280 and rear 282 flanges extending from the bottom plate 240, 705 of the lift tool. As previously discussed, the flanges 280, 282 may include slots 284 to permit forward or rearward adjustment of the lift tool 700 on the struts 276, 278 as required for a particular installation application. As shown in FIG. 13, the flanges 280, 282 may extend from one side of the bottom plate 240, 705 of the lift tool 120 such that the other side of the bottom plate 240, 705 may be placed flush against a surface 112 of the cart 110 to further secure the lift tool 120 to the cart 110 when in the mobile appliance lift tool 100 is deployed in the vertical configuration shown in FIG. 1. When the mobile appliance lift tool 100 is deployed in the inclined configuration, the lift tool 120, 700, 800 may be raised to a predetermined height 1308 above ground level to allow the lift tool 120, 700, 800 so that an appliance carried thereon may be raised to a higher level (e.g., to reach a cabinet for installation of the appliance) then when the mobile appliance lift tool 100 is deployed in the horizontal configuration.

Figure 14:
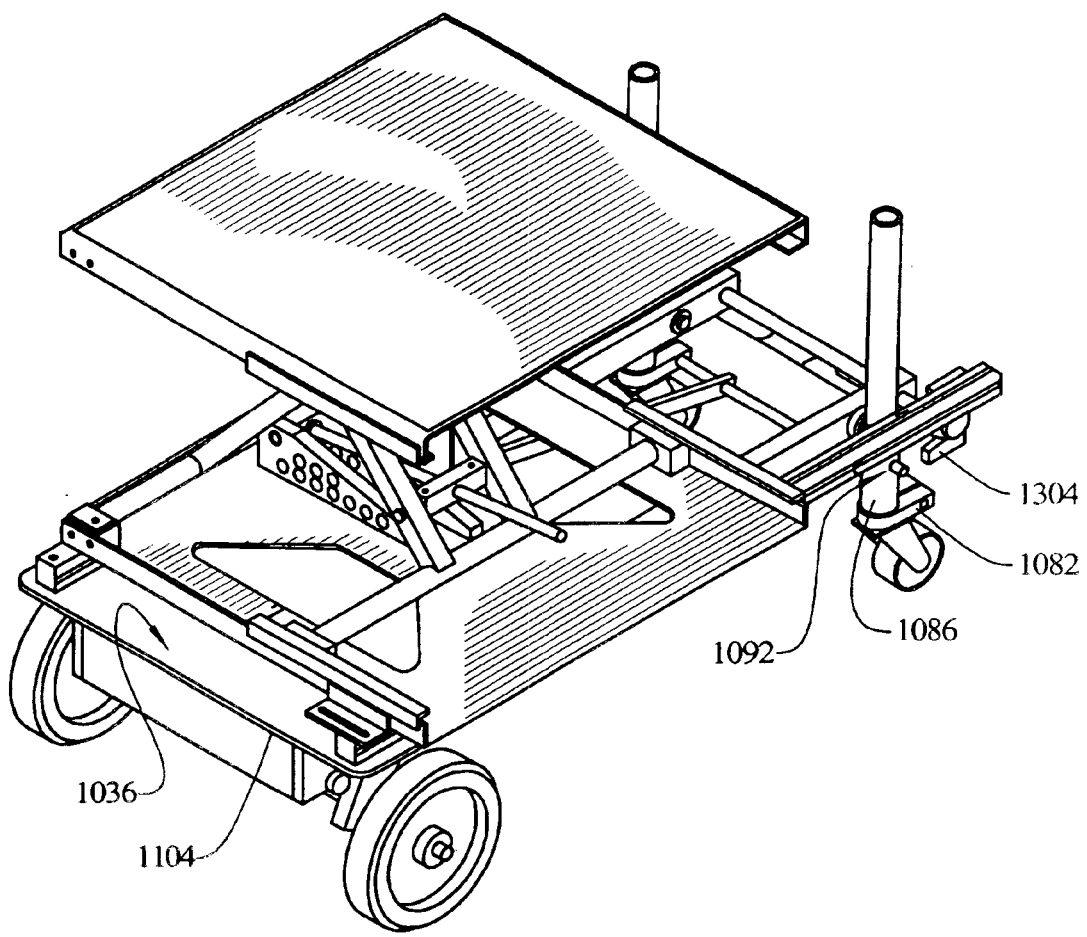
FIG. 14 depicts a perspective view of the mobile appliance lift tool of FIG. 1 deployed in a horizontal configuration.

FIG. 14 depicts the mobile appliance lift tool 100 deployed in the horizontal configuration. In one implementation, the mobile appliance lift tool 100 may be deployed in the inclined configuration by moving the rod 1078 downward so that links 1060 and 1062 pivot downward together causing the legs 1006 and 1008 to rotate away from the frame 1010. The locking mechanism 1092 of each sleeve 1086 may be released (e.g., locking pin 1096 is pulled from the opening 1096 of the leg 1006, 1008) so that the sleeve 1086 may travel down the leg 1006, 1008 and rest on the clamp 1082. The base plate 1036 is pivoted so that the surface 1104 of the base plate 1036 rests on the frame 1010. Struts 276, 278 may be disposed on either side 1016, 1018 of the frame 1010 so that each strut 276, 278 extends from the upper cross-member 1058 to the base plate 1036. In this implementation, each strut 276, 278 may be supported by the base plate 1036 resting on the frame 1010 and the upper-cross member 1058. In addition, the clasp 1304 of each strut 276, 278 may be pivoted to selectively engage the upper cross-member 1058 so that the strut 276, 278 is selectively retained on the cart 110. As shown in FIG. 13, the lift tool 120, 700, 800 may be positioned on and secured to the struts 276, 278 via front 280 and rear 282 flanges extending from the bottom plate 240, 705 of the lift tool as discussed above.

The mobile appliance lift tool 100 may be used to transport an appliance located in one area (e.g., the garage where the appliance may have been delivered by a retailer) to another area (e.g., the kitchen) where the appliance may be supported by the lift tool 120, 700, 800 of the mobile tool appliance tool 100 to facilitate the installation or removal of the appliance. For example, the lift tool 120, 700, 800 of the mobile appliance lift tool 100 may be used to engage and support an upper appliance, such as a microwave oven, or a cabinet or other similar item positioned above a range or cooktop or other lower appliance where the range or cooktop is positioned between two cabinets with countertop surfaces. It is desirable to lift and support the upper appliance without utilizing the range or cooktop (lower appliance) as a supporting surface, so as to prevent any damage to the top surface of the lower appliance, which may not be designed to support the added weight of the upper appliance.

The mobile appliance lift tool 100 may be transported to where the upper appliance to be installed or removed is located. For example, the tool 100 may be transported while deployed in the vertical configuration as shown in FIG. 10. The mobile appliance lift tool 100 may then be deployed in either the inclined or horizontal configuration so that the lift tool 120, 700, 800 of the mobile appliance lift tool 100 may lift and support the upper appliance at a desired height.

Once the mobile appliance lift tool 100 is deployed in either the inclined or horizontal configuration, the lift tool 120, 700, 800 may be adjusted on the cart 110 so that the top plate 222, 703 is positioned to engage an appropriate area of the upper appliance being supported so as to adequately support the weight of the upper appliance, particularly where the upper appliance may have internal components located such that a center of gravity of the upper appliance is not centered within the upper appliance. When the upper appliance is to be installed, the upper appliance is placed on the top plate 222, 703 of the mobile appliance lift tool 100. The upper appliance is preferably transported by the mobile appliance tool 100 while the lift tool 120, 700, 800 is collapsed.

A tool, such as an electric drill with an appropriate driver, or a non-powered wrench or driver, may be used to engage the drive profile 274, 778 of the drive screw 268, 748 to rotate the drive screw. This will cause the top plate 222, 703 to rise in a horizontal orientation to either lift the upper appliance which has been placed on the top plate, or to move up and engage a lower surface of the upper appliance to be supported and removed. Once the top plate 222, 703 has been moved up into the correct position, the upper appliance may either be secured in place, or detached from its attachment above the lower appliance by release of the fastening devices holding the upper appliance in that position. During this time, the mobile appliance lift tool 100 will fully support and stabilize the upper appliance. The rotational direction of the drive tool may then be reversed so that the drive screw 268, 748 is driven in a reverse rotational direction causing the top plate 222, 703 to be moved downwardly toward the bottom plate 240, 705, thereby lowering the upper appliance that has been detached or collapsing the lift tool after the upper appliance has been reattached.

As is apparent from the foregoing specification, the invention is susceptible of being embodied with various alterations and modifications which may differ particularly from those that have been described in the preceding specification and description. It should be understood that the scope of the patent warranted hereon is intended to include all such modifications as reasonably and properly come within the scope of the disclosed contribution to the art.

The embodiments of the invention in which an exclusive property or privilege is claimed are defined as follows:

1. A mobile appliance lift tool comprising:
    a top plate having a top end, a back end, and a substantially horizontal orientation;
    a bottom plate having a front end and a rear end;
    a lift mechanism engaged between the top plate and the bottom plate to move the top plate toward and away from the bottom plate while maintaining the horizontal orientation of the top plate;
    a cart having a first pair of wheels, a pair of legs, and a frame having a first end and a second end, the pair of wheels rotatably mounted near the first end of the frame, each leg having a sleeve pivotally attaching the leg to the second end of the frame, each sleeve being adapted to travel up and down the leg to selectively move the frame between a substantially horizontal configuration and a substantially inclined configuration; and
    at least one strut extending across and mounted below the bottom plate, the at least one strut being selectively engaged to the second end of the frame.

2. The mobile appliance lift tool according to claim 1, wherein the cart further comprises a base plate that has an outer edge and an inner edge pivotally attached to the first end of the frame such that the base plate may be rotated to a position that is substantially perpendicular to a horizontal axis of the cart, and the at least one strut is adapted to selectively rest on the outer edge of the base plate when the frame is in the inclined configuration.

3. The mobile appliance lift tool according to claim 2, wherein the base plate has a top surface and the strut is adapted to selectively rest on the top surface of the base plate when the second end of the frame is raised such that the frame is in a vertical position.

4. The mobile appliance lift tool according to claim 3, wherein the base plate has a bottom surface, and the strut is adapted to selectively rest on the bottom surface of the base plate when the frame is in the horizontal configuration and the base plate is pivoted so that the top surface rests on the frame.

5. The mobile appliance lift tool according to claim 1, wherein the frame includes an upper cross-member, and the at least one strut includes a clasp disposed to selectively engage the upper cross-member.

6. The mobile appliance lift tool according to claim 1, wherein the frame includes at least one supporting member that extends from the first end to the second end of the frame and the cart includes an upper link pivotally attached to the supporting member, a lower link pivotally attached to the upper link, and a secondary cross-member extending between and operably connected to the legs of the cart.

7. The mobile appliance lift tool according to claim 6, wherein the upper link has a first end pivotally attached to the supporting member between the lower end and a midpoint of the frame, and the lower link has a first end pivotally attached to the secondary cross-member.

8. The mobile appliance lift tool according to claim 7, wherein one of the upper and lower links has a flange adapted to abut the other one of the upper and lower links when the legs are rotated away from the frame and the upper and lower links are axially aligned.

9. The mobile appliance lift tool according to claim 6, wherein each leg includes a clamp that has an opening to receive and retain the secondary cross-member.

10. The mobile appliance lift tool according to claim 1, wherein the sleeve of at least one leg includes a locking mechanism that is adapted to releaseably hold the sleeve near an upper end of the leg so that the frame of the cart may be deployed in the inclined configuration.

11. The mobile appliance lift tool according to claim 1, wherein the sleeve of at least one leg includes a locking mechanism that is adapted to releaseably hold the sleeve near an upper end of the leg such that the frame of the cart may be deployed in the inclined configuration.

12. The mobile appliance lift tool according to claim 1, wherein at least one leg has a protrusion disposed near the lower end of the leg, the protrusion being adapted to hold the sleeve when the frame of the cart is deployed in the horizontal configuration.

13. The mobile appliance lift tool according to claim 1, wherein the lift mechanism includes:
a spaced pair of first and second pivot arms;
each of the first pivot arms having a lower end pivotally connected near the rear end of the bottom plate and having an upper end slidingly engaged near the top end of the top plate;
each of the second pivot arms having an upper end pivotally connected near the back end of the top plate and having a lower end slidingly engaged near the front end of the bottom plate,
each pair of the first and second pivot arms being pivotally connected to each other approximately midway along their lengths,
a cross member connecting the second pivot arms near the lower ends of the second pivot arms,
a threaded opening located in a surrounding material fixed relative to the cross member,
a drive screw threadingly extending through the threaded opening and being captured relative to the rear end of the bottom plate in a rotatable, but axially fixed manner.

14. The mobile appliance lift tool according to claim 13, further comprising a roller bar extending between the upper ends of the first pivot arms.

15. The mobile appliance lift tool according to claim 13, including a pivot bar extending between the lower ends of the first pivot arms and secured to the bottom plate.

16. The mobile appliance lift cool according so claim 13, including a pivot bar extending between the two lower ends of the first pivot arms and wherein the drive screw extends through an oversize opening in the pivot bar.

17. The mobile appliance lift tool according to claim 13, wherein the cross member has an oversized opening therethrough for receiving the drive screw.

18. The mobile appliance lift tool according to claim 17, including a bearing located in the oversized opening in the cross member.

19. The mobile appliance lift tool according to claim 13, wherein the threaded opening is formed in a block separate from, but attached to the cross member.

20. The mobile appliance lift tool according to claim 19, wherein the block is attached to the cross member via a horizontal plate spacing the block a distance rearward of the cross member.

21. The mobile appliance lift tool according to claim 13, wherein the upper ends of the first pivot arms carry rollers which are captured in slots formed in downward depending flanges of the top plate.

22. The mobile appliance lift tool according to claim 13, wherein the lower ends of the second pivot arms carry rollers which are captured in tracks formed by upward and inward extending flanges of the bottom plate.

23. The mobile appliance lift tool according to claim 13, wherein the front stint is adjustably positioned relative to the bottom plate in a front to rear direction.

24. The mobile appliance lift tool according to claim 13, wherein the top plate has downward and inward extending flanges that define a pair of tracks on respective sides of the top plate, the mobile appliance lift tool further comprising:
a pair of rod retainer blocks disposed within the tracks and adapted to slidingly move along the tracks when engaged; and
a front rod extending between and pivotally attached to the rod retainer blocks, the upper ends of the first pivot arms being attached to the front rod.

25. The mobile appliance lift tool according to claim 13, further comprising:
a pair of rod retainer blocks disposed near the rear end of the bottom plate; and
a rear rod extending between the rod retainer blocks, the lower ends of the first pivot arms being attached to the rear rod.

26. The mobile appliance lift tool according to claim 13, wherein the bottom plate has upward and inward extending flanges that define a pair of tracks on respective sides of the bottom plate, the mobile appliance lift tool further comprising:

a pair of rod retainer blocks disposed within the tracks and adapted to slidingly move along the tracks when engaged; and a front rod extending between and pivotally attached to the rod retainer blocks, the lower ends of the second pivot arms being attached to the front rod.

27. The mobile appliance lift tool according to claim 13, further comprising:

a pair of rod retainer blocks disposed near the rear end of the top plate; and a rear rod extending between the rod retainer blocks, the upper ends of the second pivot arms being attached to the rear rod.

28. The mobile appliance lift tool according to claim 13, wherein the cross member is a rod retainer block having an opening therethrough for receiving the drive screw.

29. The mobile appliance lift tool according to claim 13, further comprising a pivot block disposed near the rear end of the bottom plate and having a threaded opening to receive and engage the drive screw.

30. The mobile appliance lift tool according to claim 29, wherein the bottom frame has two parallel internal walls disposed such that the drive screw lies axially between the walls, and the pivot block is pivotally attached to the walls.

31. The mobile appliance lift tool according to claim 13, wherein the front strut is adjustably positioned relative to the bottom plate in a front to rear direction.

32. The mobile appliance lift tool according to claim 13, wherein the cart includes a second pair of wheels disposed at the lower ends of the legs.

33. The mobile appliance lift tool according to claim 1, further comprising:

a front rod extending across the bottom plate and slidingly engaged near the front end of the bottom plate;

a rear rod disposed near the rear end of the bottom plate and extending across the bottom plate;

wherein the lift mechanism includes:

a spaced pair of first and second pivot arms;

each of the first pivot arms having a lower end pivotally connected to the rear rod and having an upper end slidingly engaged near the top end of the top plate;

each of the second pivot arms having an upper end pivotally connected near the back end of the top plate and having a lower end pivotally connected to the front rod, each pair of the first and second pivot arms being pivotally connected to each other approximately midway along their lengths, and a jack operably coupled to the front rod and operably configured to selectively adjust a distance between the front and rear rods.

34. The mobile appliance lift tool according to claim 33, wherein the jack includes:

a first pair of first and second lever arms each having an inner end and an outer end, the pair of first and second lever arms are disposed in relation to the bottom plate and pivotally attached together near the inner end of each lever arm, the outer end of the first lever arm engages the front rod and the outer end of the second lever arm engages the bottom frame.

35. The mobile appliance lift tool according to claim 34, wherein the outer end of the first lever arm is pivotally attached to the front rod so that the front rod is adapted to pivot when slidingly engaged to the bottom plate.

36. The mobile appliance lift tool according to claim 34, wherein the outer end of the second lever arms is pivotally attached to the rear rod.

37. The mobile appliance lift tool according to claim 33, wherein the jack further includes:

a second pair of first and second lever arms, the first pair of lever arms is disposed in mirror relationship to the second pair of lever arms;

a drive screw;

a rod retainer block pivotally attached to the inner ends of the first pair of lever arms and having a threaded opening to receive and engage the drive screw; and a pivot block pivotally attached to the inner ends of the second pair of lever arms and adapted to rotatingly receive and capture the drive screw in an axial direction.

38. The mobile appliance lift tool according to claim 37, wherein the cart further comprises a base plate that has an outer edge and an inner edge pivotally attached to the first end of the frame such that the base plate may be rotated to a position that is substantially perpendicular to a horizontal axis of the cart, and the at least one strut is adapted to selectively rest on the outer edge of the base plate when the frame is in the inclined configuration.

39. The mobile appliance lift tool according to claim 33, wherein the base plate has a bottom surface, and the strut is adapted to selectively rest on the bottom surface of the base plate when the frame is in the horizontal configuration and the base plate is pivoted so that the top surface rests on the frame.

40. A mobile appliance lift tool comprising:

a cart having a first pair of wheels, a pair of legs, and a frame having a first end and a second end, the pair of wheels rotatably mounted near the first end of the frame, each leg having a sleeve pivotally attaching the leg to the second end of the frame, each sleeve being adapted to travel up and down the leg to selectively move the frame between a substantially horizontal configuration and a substantially inclined configuration;

a lift tool having a bottom frame, a support platform disposed in a first orientation, and a lift mechanism engaged between the bottom frame and the support platform to move the support platform toward and away the bottom frame, while maintaining the support platform in the first orientation; and a strut mounted to the bottom frame of the lift tool and pivotally attached to the second end of the frame of the cart, the strut being disposed in a horizontal orientation when the frame is moved to the horizontal configuration and to the inclined configuration.

41. The mobile appliance lift tool according to claim 40, wherein the base plate has a top surface and the strut is adapted to selectively rest on the top surface of the base plate when the second end of the frame is raised such that the frame is in a vertical position.

* * * * *

UNITED STATES PATENT AND TRADEMARK OFFICE
CERTIFICATE OF CORRECTION

PATENT NO. : 6,929,250 B2
DATED : August 16, 2005
INVENTOR(S) : Blake et al.

It is certified that error appears in the above-identified patent and that said Letters Patent is hereby corrected as shown below:

Title page,
Item [73], Assignee, should read -- Whirlpool Corporation, Benton Harbor, MI (US) --.

Signed and Sealed this

Twenty-fourth Day of January, 2006

JON W. DUDAS
*Director of the United States Patent and Trademark Office*